United States Patent
Ryuma et al.

(10) Patent No.: US 10,965,931 B1
(45) Date of Patent: Mar. 30, 2021

(54) SENSOR MISALIGNMENT COMPENSATION

(71) Applicants: Dmitry Ryuma, Marina Del Rey, CA (US); David Ben Ezra, Los Angeles, CA (US); Dunxu Hu, Los Angeles, CA (US); Patrick Timothy McSweeney Simons, Redondo Beach, CA (US)

(72) Inventors: Dmitry Ryuma, Marina Del Rey, CA (US); David Ben Ezra, Los Angeles, CA (US); Dunxu Hu, Los Angeles, CA (US); Patrick Timothy McSweeney Simons, Redondo Beach, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/706,162

(22) Filed: Dec. 6, 2019

(51) Int. Cl.
H04N 13/239 (2018.01)
H04N 13/344 (2018.01)
H04N 13/246 (2018.01)
G06T 7/80 (2017.01)
G02B 27/01 (2006.01)

(52) U.S. Cl.
CPC ....... H04N 13/246 (2018.05); G02B 27/0172 (2013.01); G06T 7/85 (2017.01); H04N 13/239 (2018.05); H04N 13/344 (2018.05); G02B 2027/0134 (2013.01); G02B 2027/0138 (2013.01); G02B 2027/0178 (2013.01); G06T 2207/10012 (2013.01)

(58) Field of Classification Search
CPC .............. G06T 7/85; G02B 2027/0136; G02B 2027/0134; G02B 2027/0138; G02B 2027/0178; G02B 2207/10012
See application file for complete search history.

(56) References Cited

U.S. PATENT DOCUMENTS

| | | | | |
|---|---|---|---|---|
| 7,784,938 | B2* | 8/2010 | Richards | G02C 7/10 351/159.65 |
| 8,496,173 | B2* | 7/2013 | Anselment | G06K 7/14 235/440 |
| 9,239,460 | B2* | 1/2016 | Sylvan | G02B 27/0149 |
| 9,609,194 | B2* | 3/2017 | Egger | G01J 3/10 |
| 9,609,305 | B1* | 3/2017 | Ramaswamy | H04N 13/254 |
| 9,628,778 | B2* | 4/2017 | Hsueh | H04N 13/246 |
| 9,635,222 | B2 | 4/2017 | Blum | |
| 9,759,918 | B2* | 9/2017 | Ebstyne | G06T 7/80 |
| 9,792,667 | B2* | 10/2017 | Sun | H04N 17/002 |
| 10,152,119 | B2* | 12/2018 | Tseng | G06F 3/012 |
| 10,168,772 | B2* | 1/2019 | Kim | G06F 3/013 |
| 10,178,378 | B2* | 1/2019 | Travis | H04N 13/383 |
| 10,215,989 | B2* | 2/2019 | Harrison | G02B 27/0176 |
| 10,271,042 | B2* | 4/2019 | Rougeaux | G02B 27/0172 |

(Continued)

Primary Examiner — Brian P Yenke
(74) Attorney, Agent, or Firm — Culhane Meadows PLLC; Stephen J. Weed

(57) ABSTRACT

Camera compensation methods and systems that compensate for misalignment of sensors/camera in stereoscopic camera systems. The compensation includes identifying a pitch angle offset between a first camera and a second camera, determining misalignment of the first and second cameras from the identified pitch angle offset, determining a relative compensation delay responsive to the determined misalignment, introducing the relative compensation delay to image streams produced by the cameras, and producing a stereoscopic image on a display from the first and second image streams with the introduced delay.

16 Claims, 21 Drawing Sheets

(56) References Cited

U.S. PATENT DOCUMENTS

| | | | | |
|---|---|---|---|---|
| 10,368,059 B2* | 7/2019 | Fateh | | G02B 27/0172 |
| 10,378,882 B2* | 8/2019 | Yeoh | | G06F 3/013 |
| 10,410,367 B2* | 9/2019 | Ezra | | G06T 7/70 |
| 10,412,368 B2* | 9/2019 | Osterwood | | B25J 9/1697 |
| 10,412,382 B2* | 9/2019 | Cole | | H04N 13/232 |
| 10,503,247 B2* | 12/2019 | Samples | | A63F 13/5255 |
| 10,504,243 B2* | 12/2019 | Linde | | G06T 7/292 |
| 10,506,219 B2* | 12/2019 | Hwang | | A61B 3/0025 |
| 10,511,832 B1* | 12/2019 | Shen | | G02B 5/045 |
| 10,587,868 B2* | 3/2020 | Yun | | G06F 3/012 |
| 10,630,965 B2* | 4/2020 | Held | | G02B 27/0172 |
| 10,650,602 B2* | 5/2020 | You | | G06T 7/55 |
| 10,757,342 B1* | 8/2020 | Ding | | H04N 5/2353 |
| 2002/0075201 A1* | 6/2002 | Sauer | | H04N 13/344 |
| | | | | 345/7 |
| 2002/0113756 A1* | 8/2002 | Tuceryan | | H04N 13/376 |
| | | | | 345/8 |
| 2010/0007582 A1 | 1/2010 | Zalewski | | |
| 2012/0167124 A1 | 6/2012 | Abdeljaoued | | |
| 2013/0015244 A1* | 1/2013 | Anselment | | G06K 7/10712 |
| | | | | 235/440 |
| 2013/0120224 A1* | 5/2013 | Cajigas | | G09G 5/00 |
| | | | | 345/8 |
| 2013/0187943 A1* | 7/2013 | Bohn | | G02B 27/0093 |
| | | | | 345/619 |
| 2015/0055085 A1* | 2/2015 | Fonte | | G06F 30/00 |
| | | | | 351/178 |
| 2015/0185476 A1 | 7/2015 | Lee | | |
| 2015/0215547 A1* | 7/2015 | Muller | | G01J 3/2803 |
| | | | | 348/598 |
| 2015/0338498 A1* | 11/2015 | Weber | | G02B 27/126 |
| | | | | 348/169 |
| 2016/0037032 A1* | 2/2016 | Iwama | | H04N 5/2253 |
| | | | | 348/148 |
| 2016/0117864 A1* | 4/2016 | Cajigas | | G06T 19/006 |
| | | | | 345/633 |
| 2016/0119523 A1* | 4/2016 | Egger | | G01J 3/2803 |
| | | | | 348/370 |
| 2016/0225191 A1* | 8/2016 | Mullins | | G02B 27/0179 |
| 2017/0034499 A1* | 2/2017 | Doron | | H04N 13/25 |
| 2018/0017815 A1* | 1/2018 | Chumbley | | G02C 5/12 |
| 2018/0031842 A1* | 2/2018 | Tsai | | G06F 1/1637 |
| 2018/0213201 A1* | 7/2018 | Zhang | | G06T 7/97 |
| 2018/0288317 A1* | 10/2018 | Nopper | | H04N 5/349 |
| 2019/0076013 A1* | 3/2019 | Aferzon | | G02C 13/005 |
| 2019/0108652 A1* | 4/2019 | Linde | | G06T 7/292 |
| 2019/0129184 A1* | 5/2019 | Hu | | G02B 27/0172 |
| 2019/0158716 A1* | 5/2019 | Kerr | | G06T 7/13 |
| 2019/0243157 A1* | 8/2019 | Sheldon | | G02C 5/06 |
| 2019/0258077 A1* | 8/2019 | Sheldon | | G02C 5/06 |
| 2019/0281199 A1* | 9/2019 | Muller | | H04N 5/2256 |
| 2020/0074684 A1* | 3/2020 | Lin | | H04N 13/204 |
| 2020/0077073 A1* | 3/2020 | Nash | | H04N 13/246 |
| 2020/0107005 A1* | 4/2020 | Katz | | H04N 13/344 |
| 2020/0107013 A1* | 4/2020 | Hudman | | H04N 13/239 |
| 2020/0175238 A1* | 6/2020 | Muller | | G06K 7/10722 |
| 2020/0175705 A1* | 6/2020 | Ezra | | G06T 7/70 |
| 2020/0204787 A1 | 6/2020 | Ardisana et al. | | |

\* cited by examiner

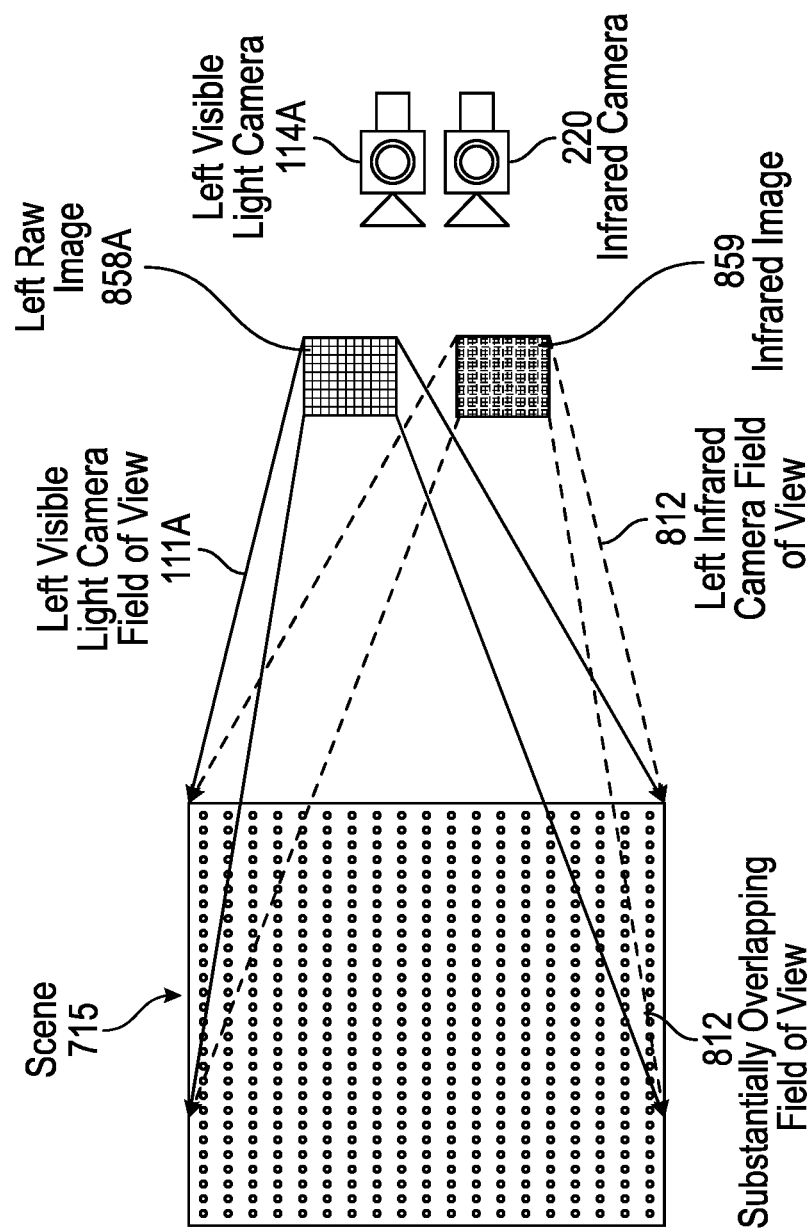

SENSOR MISALIGNMENT COMPENSATION

TECHNICAL FIELD

The present subject matter relates to wearable devices, e.g., eyewear devices, having stereoscopic camera systems and techniques for compensating for differences in pitch between sensors/cameras of the stereoscopic camera systems.

BACKGROUND

Stereoscopic camera systems utilize a pair of sensors/cameras to capture images of a scene from two viewpoints. A conventional camera in such systems typically utilizes either a charge coupled device (CCD) sensor or a complementary metal oxide semiconductor (CMOS) sensor to capture an image frame of a scene. CCD sensors typically use a global shutter, which simultaneously captures the entire frame. CMOS sensors, on the other hand, typically use a rolling shutter, which sequentially exposes different parts of the frame at different points in time.

BRIEF DESCRIPTION OF THE DRAWINGS

The drawing figures depict one or more implementations, by way of example only, not by way of limitations. In the figures, like reference numerals refer to the same or similar elements with a letter designation added to differentiate between the same or similar elements. The letter designation may be dropped when the same or similar elements are referred to collectively or when referring to a non-specific one of the same or similar elements.

FIG. 8A depicts an example of infrared light captured by an infrared camera of a depth sensor as an infrared image and visible light captured by a visible light camera as a raw image to generate an initial depth image of a scene.

DETAILED DESCRIPTION

Figure 1A:
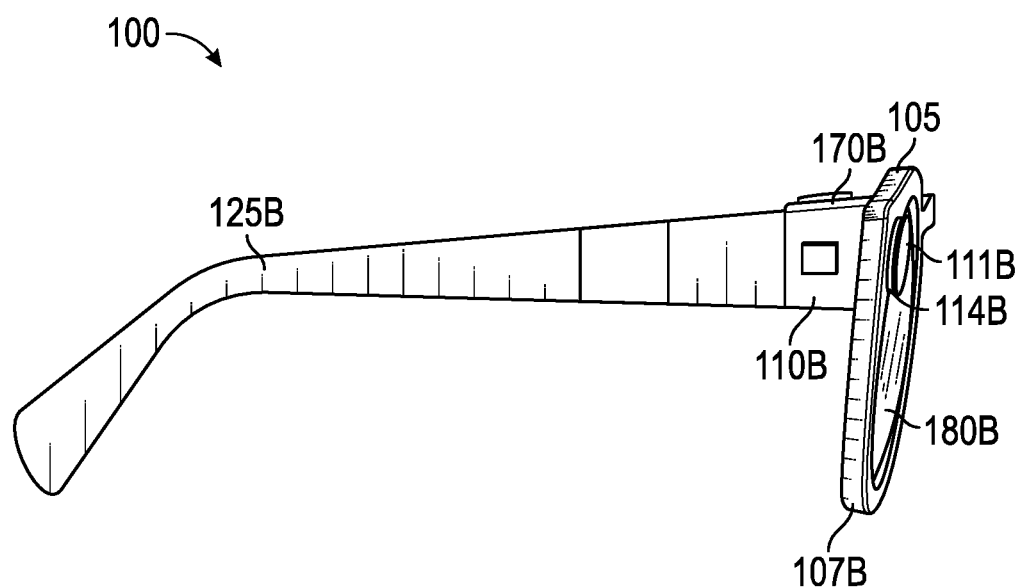
FIG. 1A is a side view of an example hardware configuration of an eyewear device utilized in a camera misalignment compensation system.

In typical stereoscopic camera systems, the sensors/cameras are synchronized and operate in a master-slave model. The cameras are driven by the same clock and use the same exposure settings. The cameras of a device may be misaligned (e.g., on the Y-axis; vertical axis) due to mechanical misalignment tolerances during assembly at the factory. Misalignment of the cameras causes feature points from a scene to be projected to different sensor lines. While stereo calibration can often compensate for these differences in static scenes, they may not be able to do so for moving objects and/or when the observer is moving.

Assuming a feature is projected to line Y1 on a first sensor (sensor1) and to line Y2 on a second sensor (sensor2), lines Y1 and Y2 are exposed at different times when using a rolling shutter read out method (which is typical for CMOS sensors). Assuming it takes time, t, to read out a single sensor line, the time difference, T, equals $t*abs(Y1-Y2)$. If the object or the cameras are moving, this time difference will result in different positions of the feature point on two sensors/cameras, which complicates stereo matching of the feature point. The impact of this misalignment may be addressed after exposure/capture of the images or before exposure/capture of the images. In one approach the vertical blanking interval (V-blank period) is maximized to reduce time 't' and minimize 'T'. In another approach, exposure delay counted in sensor lines (i.e., in 't' units) is introduced in order to postpone readout from one of the sensors such that lines Y1 and Y2 are exposed at substantially the same time. Exposure delay is a feature available in modern sensors from, for example, Sony Corporation of Minato, Japan. During stereo calibration at the factory, the misalignment information may be stored on the device. On bootup, the calibration data is read out and the misalignment angle is converted into the required delay in lines. Prior to camera activation the sensors are configured with the delay times. The autoexposure algorithm may be adjusted to account for the worst-case delay.

In this detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

As used herein, the term "coupled" or "connected" refers to any logical, optical, physical or electrical connection, link or the like by which electrical or magnetic signals produced or supplied by one system element are imparted to another coupled or connected element. Unless described otherwise, coupled or connected elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element.

The orientations of the eyewear device, associated components and any complete devices incorporating a depth-capturing camera such as shown in any of the drawings, are given by way of example only, for illustration and discussion purposes. In operation for camera misalignment compensation, the eyewear device may be oriented in any other direction suitable to the application of the eyewear device, for example up, down, sideways, or any other orientation. Also, to the extent used herein, any directional term, such as front, rear, inwards, outwards, towards, left, right, lateral, longitudinal, up, down, upper, lower, top, bottom, side, horizontal, vertical, and diagonal are used by way of example only, and are not limiting as to direction or orientation of any depth-capturing camera or component of the depth-capturing camera constructed as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

Figure 1B:
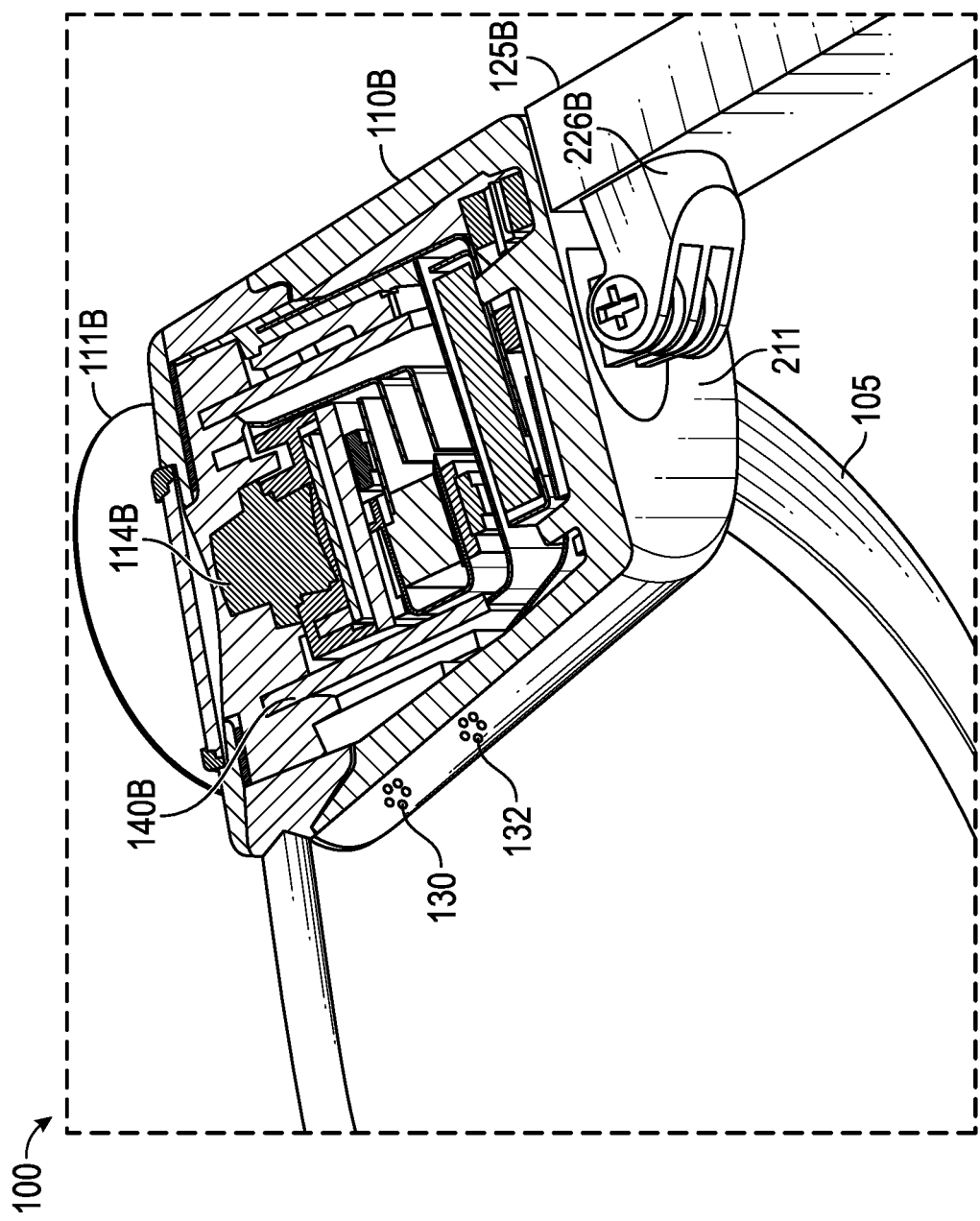
FIG. 1B is a top cross-sectional view of a right electronic housing of the eyewear device of FIG. 1A depicting a right visible light camera of a depth-capturing camera, and a circuit board.
Figure 1C:
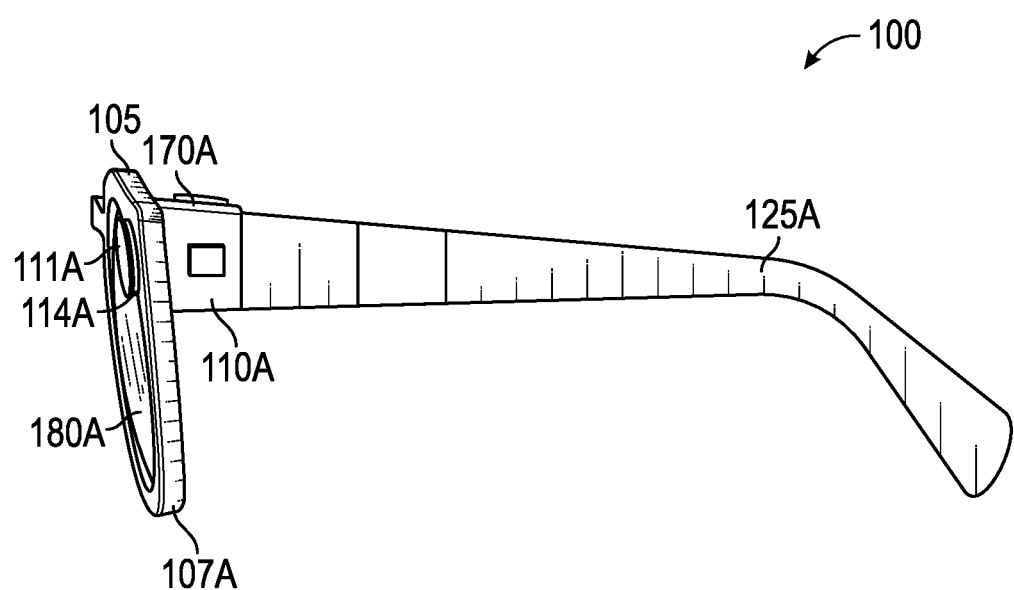
FIG. 1C is a left side view of an example hardware configuration of an eyewear device of FIG. 1A, which shows a left visible light camera of the depth-capturing camera.
Figure 1D:
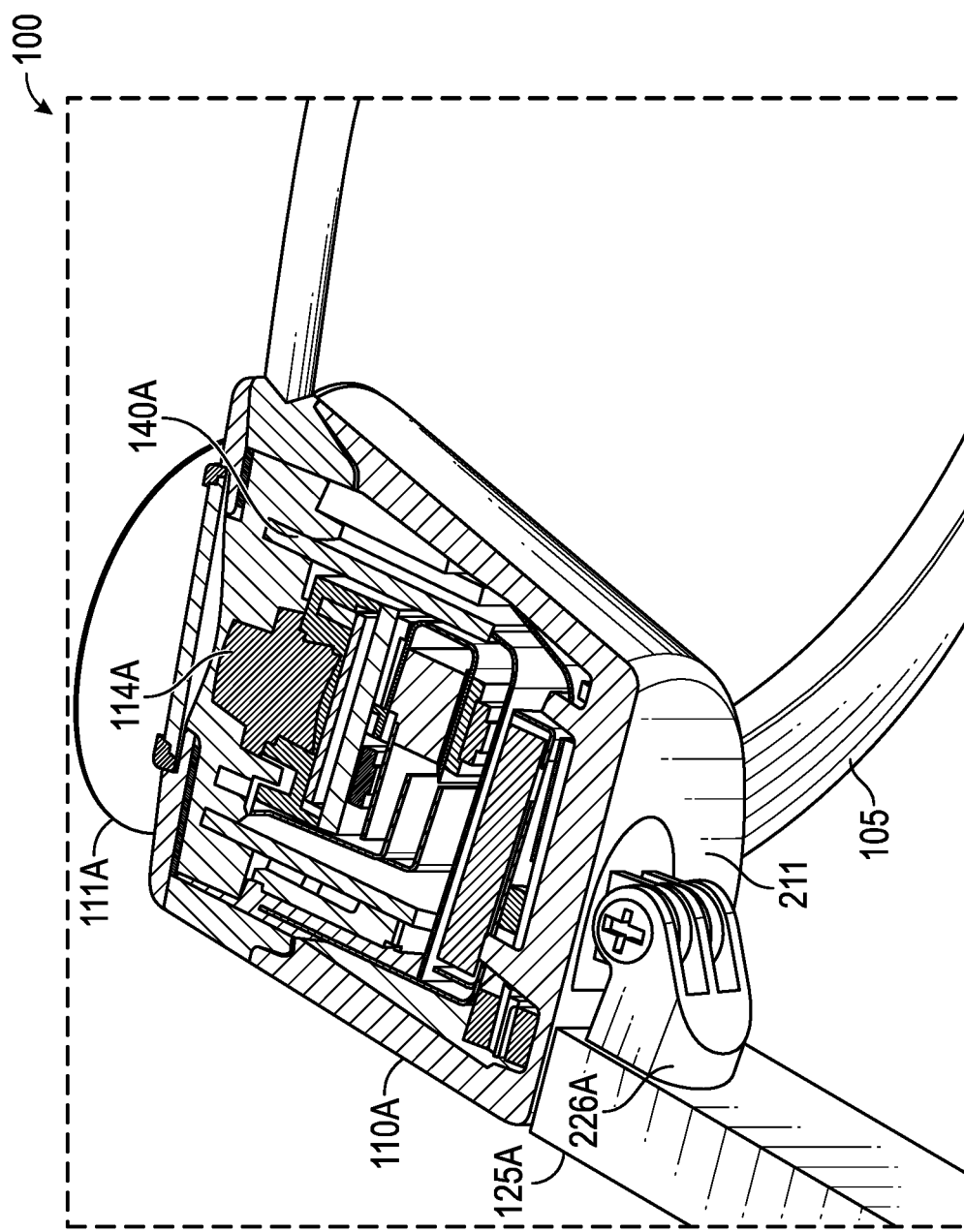
FIG. 1D is a top cross-sectional view of a left electronic housing of the eyewear device of FIG. 1C depicting the left visible light camera of the depth-capturing camera, and the circuit board.

As shown in FIGS. 1A and 1B, the eyewear device 100 includes a right visible light camera 114B. The eyewear device 100 can include multiple visible light cameras 114A and 114B that form a passive type of depth-capturing camera, such as stereo camera, of which the right visible light camera 114B is located on a right electronic housing 110B. As shown in FIGS. 1C and 1D, the eyewear device 100 also includes a left visible light camera 114A.

Left and right visible light cameras 114A and 114B are sensitive to the visible light range wavelength. Each of the visible light cameras 114A and 114B have a different frontward facing field of view which are overlapping to allow three-dimensional depth images to be generated, for example, right visible light camera 114B has the depicted right field of view 111B (see FIGS. 8A and 8B). Generally, a "field of view" is the part of the scene that is visible through the camera at a position and orientation in space. Objects or object features outside the field of view 111A and 111B when the image is captured by the visible light camera are not recorded in a raw image (e.g., photograph or picture). The field of view describes an angle range or extent which the image sensor of the visible light camera 114A and 114B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible light cameras 114A and 114B have a field of view with an angle of view between 15° to 30°, for example 24°, and have a resolution of 480×480 pixels or greater. The "angle of coverage" describes the angle range that a lens of visible light cameras 114A and 114B or infrared camera 220 (see FIG. 2A) can effectively image. Typically, the image circle produced by a camera lens is large enough to cover the film or sensor completely, possibly including some vignetting (i.e., a reduction of an image's brightness or saturation at the periphery compared to the image center). If the angle of coverage of the camera lens does not fill the sensor, the image circle will be visible, typically with strong vignetting toward the edge, and the effective angle of view will be limited to the angle of coverage.

Examples of such visible lights camera 114A and 114B include a high-resolution complementary metal-oxide-semiconductor (CMOS) image sensor and a video graphic array (VGA) camera, such as 640p (e.g., 640×480 pixels for a total of 0.3 megapixels), 720p, or 1080p. As used herein, the term "overlapping" when referring to field of view means the matrix of pixels in the generated raw image(s) or infrared image of a scene overlap by 30% or more. As used herein, the term "substantially overlapping" when referring to field of view means the matrix of pixels in the generated raw image(s) or infrared image of a scene overlap by 50% or more. Suitable visible light cameras 114 include complementary metal-oxide-semiconductor (CMOS) sensor cameras with rolling shutter readout. In one example, the cameras 114 include a V-blank period setting for use in minimizing the time difference, T, between feature points obtained by two separate cameras. In another example, the cameras 114 include an exposure delay setting that is counted in sensor lines, such as cameras available from Sony Corporation of Minato, Japan, to postpose readout of one of the cameras in order to expose feature points falling on different lines at substantially the same time. Other suitable cameras will be understood by one of skill in the art from the description herein.

Image sensor data from the visible light cameras 114A and 114B are captured along with geolocation data, digitized by an image processor, and stored in a memory. The captured left and right raw images captured by respective visible light cameras 114A and 114B are in the two-dimensional space domain and comprise a matrix of pixels on a two-dimensional coordinate system that includes an X axis for horizontal position and a Y axis for vertical position. Each pixel includes a color attribute (e.g., a red pixel light value, a green pixel light value, and/or a blue pixel light value); and a position attribute (e.g., an X location coordinate and a Y location coordinate).

To provide stereoscopic vision, visible light cameras 114A and 114B may be coupled to an image processor (element 912 of FIG. 9) for digital processing along with a timestamp in which the image of the scene is captured. Image processor 912 includes circuitry to receive signals from the visible light cameras 114A and 114B and process those signals from the visible light camera 114 into a format suitable for storage in the memory. The timestamp can be added by the image processor or other processor, which controls operation of the visible light cameras 114A and 114B. Visible light cameras 114A and 114B allow the depth-capturing camera to simulate human binocular vision. The depth-capturing camera provides the ability to reproduce three-dimensional images based on two captured images from the visible light cameras 114A and 114B having the same timestamp. Such three-dimensional images allow for an immersive life-like experience, e.g., for virtual reality or video gaming. Three-dimensional depth videos may be produced by stitching together a sequence of three-dimensional depth images with associated time coordinates for a presentation time in a depth video.

For stereoscopic vision, a pair of raw red, green, and blue (RGB) images are captured of a scene at a moment in time—one image for each of the left and right visible light cameras 114A and 114B. When the pair of captured raw images from the frontward facing left and right field of views 111A and 111B of the left and right visible light cameras 114A and 114B are processed (e.g., by the image processor), depth images are generated, and the generated depth images can be perceived by a user on the optical assembly 180A and 180B or other image display(s) (e.g., of a mobile device). The generated depth images are in the three-dimensional space domain and can comprise a matrix of vertices on a three-dimensional location coordinate system that includes an X axis for horizontal position (e.g., length), a Y axis for vertical position (e.g., height), and a Z axis for a depth position (e.g., distance).

A depth video further associates each of a sequence of generated depth images with a time coordinate on a time (T) axis for a presentation time in a depth video (e.g., each depth image includes spatial components as well as a temporal component). The depth video can further include one or more input parameter components (e.g., an audio component such as an audio track or stream, a biometric comp such as a heartrate graph, etc.), which may be captured by an input device such as a microphone or a heartrate monitor. Each vertex includes a color attribute (e.g., a red pixel light value, a green pixel light value, and/or a blue pixel light value); a position attribute (e.g., an X location coordinate, a Y location coordinate, and a Z location coordinate); a texture attribute, and/or a reflectance attribute. The texture attribute quantifies the perceived texture of the depth image, such as the spatial arrangement of color or intensities in a region of vertices of the depth image.

Generally, perception of depth arises from the disparity of a given 3D point in the left and right raw images captured by visible light cameras 114A and 114B. Disparity is the difference in image location of the same 3D point when projected under perspective of the visible light cameras 114A and 114B ($d = x_{left} - x_{right}$). For visible light cameras 114A and 114B with parallel optical axes, focal length f, baseline b, and corresponding image points ($x_{left}$, $y_{left}$) and ($x_{right}$, $y_{right}$), the location of a 3D point (Z axis location coordinate) can be derived utilizing triangulation which determines depth from disparity. Typically, depth of the 3D point is inversely proportional to disparity. A variety of other techniques can also be used for the generation of three-dimensional depth images.

In an example, a camera misalignment compensation system includes the eyewear device 100. The eyewear device 100 includes a frame 105 and a left temple 110A extending from a left lateral side 170A of the frame 105 and a right temple 110B extending from a right lateral side 170B of the frame 105. Eyewear device 100 further includes a depth-capturing camera. The depth-capturing camera includes: (i) at least two visible light cameras with overlapping fields of view; or (ii) a least one visible light camera 114A and 114B and a depth sensor (element 213 of FIG. 2A). In one example, the depth-capturing camera includes a left visible light camera 114A with a left field of view 111A connected to the frame 105 or the left temple 110A to capture a left image of the scene. Eyewear device 100 further includes a right visible light camera 114B connected to the frame 105 or the right temple 110B with a right field of view 111B to capture (e.g., simultaneously with the left visible light camera 114A) a right image of the scene which partially overlaps the left image.

The camera misalignment compensation system further includes a computing device, such as a host computer (e.g., mobile device 990 of FIGS. 9 and 10) coupled to eyewear device 100 over a network. The camera misalignment compensation system further includes an image display (optical assembly 180A and 180B of eyewear device; image display 1080 of mobile device 990 of FIG. 10) for presenting (e.g., displaying) a video including images. The camera misalignment compensation system further includes an image display driver (element 942 of eyewear device 100 of FIG. 9; element 1090 of mobile device 990 of FIG. 10) coupled to the image display (optical assembly 180A and 180B of eyewear device; image display 1080 of mobile device 990 of FIG. 10) to control the image display to present the initial video.

In some examples, user input is received to indicate that the user desires to capture an image. For example, the camera misalignment compensation system further includes a user input device to receive a user input. Examples of user input devices include a touch sensor (element 991 of FIG. 9 for the eyewear device 100), a touch screen display (element 1091 of FIG. 10 for the mobile device 1090), and a computer mouse for a personal computer or a laptop computer. The camera misalignment compensation system further includes a processor (element 932 of eyewear device 100 of FIG. 9; element 1030 of mobile device 990 of FIG. 10) coupled to the eyewear device 100 and the depth-capturing camera. The camera misalignment compensation system further includes a memory (element 934 of eyewear device 100 of FIG. 9; elements 1040A-B of mobile device 990 of FIG. 10) accessible to the processor, and programming in the memory (element 945 of eyewear device 100 of FIG. 9; element 945 of mobile device 990 of FIG. 10), for example in the eyewear device 100 itself, mobile device (element 990 of FIG. 9), or another part of the camera misalignment compensation system (e.g., server system 998 of FIG. 9).

Execution of the camera misalignment programming (element 945 of FIG. 9) by the processor (element 932 of FIG. 9) configures the eyewear device 100 to compensate for camera misalignment when processing raw images 858A-B after rectification. Each of the initial depth images is associated with a time coordinate on a time (T) axis for a presentation time, for example, based on initial images 957A-B in the initial video. The initial depth image is formed of a matrix of vertices. Each vertex represents a pixel in a three-dimensional scene. Each vertex has a position attribute. The position attribute of each vertex is based on a three-dimensional location coordinate system and includes an X location coordinate on an X axis for horizontal position, a Y location coordinate on a Y axis for vertical position, and a Z location coordinate on a Z axis for a depth position.

Execution of the camera misalignment compensation programming (element 945 of FIG. 10) by the processor (element 945 of FIG. 10) configures the mobile device (element 990 of FIG. 10) of the camera misalignment compensation system to perform the following functions. Mobile device (element 990 of FIG. 10) identifies a pitch angle offset between the left and right visible light camera 114 (or between a visible light camera and an infrared depth camera). Mobile device (element 990 of FIG. 10) then determines misalignment of the first and second cameras from the identified pitch angle offset. Next, mobile device (element 990 of FIG. 10) produces a stereoscopic image on the display from the first and second image streams with the introduced relative compensation delay to compensate for the pitch angle offset.

FIG. 1B is a top cross-sectional view of a right electronic housing 110B of the eyewear device 100 of FIG. 1A depicting the right visible light camera 114B of the depth-capturing camera, and a circuit board. FIG. 1C is a left side view of an example hardware configuration of an eyewear device 100 of FIG. 1A, which shows a left visible light camera 114A of the depth-capturing camera. FIG. 1D is a top cross-sectional view of a left electronic housing 110A of the eyewear device of FIG. 1C depicting the left visible light camera 114A of the depth-capturing camera, and a circuit board. Construction and placement of the left visible light camera 114A is substantially similar to the right visible light camera 114B, except the connections and coupling are on the left lateral side 170A. As shown in the example of FIG. 1B, the eyewear device 100 includes the right visible light camera 114B and a circuit board, which may be a flexible printed circuit board (PCB) 140B. The right hinge 126B connects the right electronic housing 110B to a right temple 125B of the eyewear device 100. In some examples, components of the right visible light camera 114B, the flexible PCB 140B, or other electrical connectors or contacts may be located on the right temple 125B or the right hinge 126B.

The right electronic housing 110B includes electronic housing body 211 and an electronic housing cap, with the electronic housing cap omitted in the cross-section of FIG. 1B. Disposed inside the right electronic housing 110B are various interconnected circuit boards, such as PCBs or flexible PCBs, that include controller circuits for right visible light camera 114B, microphone(s), low-power wireless circuitry (e.g., for wireless short-range network communication via Bluetooth™), high-speed wireless circuitry (e.g., for wireless local area network communication via Wi-Fi).

The right visible light camera 114B is coupled to or disposed on the flexible PCB 140 and covered by a visible light camera cover lens, which is aimed through opening(s) formed in the frame 105. For example, the right rim 107B of the frame 105 is connected to the right electronic housing 110B and includes the opening(s) for the visible light camera cover lens. The frame 105 includes a front-facing side configured to face outwards away from the eye of the user. The opening for the visible light camera cover lens is formed on and through the front-facing side. In the example, the right visible light camera 114B has an outward facing field of view 111B with a line of sight or perspective of the right eye of the user of the eyewear device 100. The visible light camera cover lens can also be adhered to an outward facing surface of the right electronic housing 110B in which an opening is formed with an outward facing angle of coverage, but in a different outward direction. The coupling can also be indirect via intervening components.

Left (first) visible light camera 114A is connected to a left image display of left optical assembly 180A and captures a left eye viewed scene observed by a wearer of the eyewear device 100 in a left raw image. Right (second) visible light camera 114B is connected to a right image display of right optical assembly 180B and captures a right eye viewed scene observed by the wearer of the eyewear device 100 in a right raw image. The left raw image and the right raw image partially overlap for use in presenting a three-dimensional observable space of a generated depth image.

Flexible PCB 140B is disposed inside the right electronic housing 110B and is coupled to one or more other components housed in the right electronic housing 110B. Although shown as being formed on the circuit boards of the right electronic housing 110B, the right visible light camera 114B can be formed on the circuit boards of the left electronic housing 110A, the temples 125A and 125B, or frame 105.

Figure 2A:
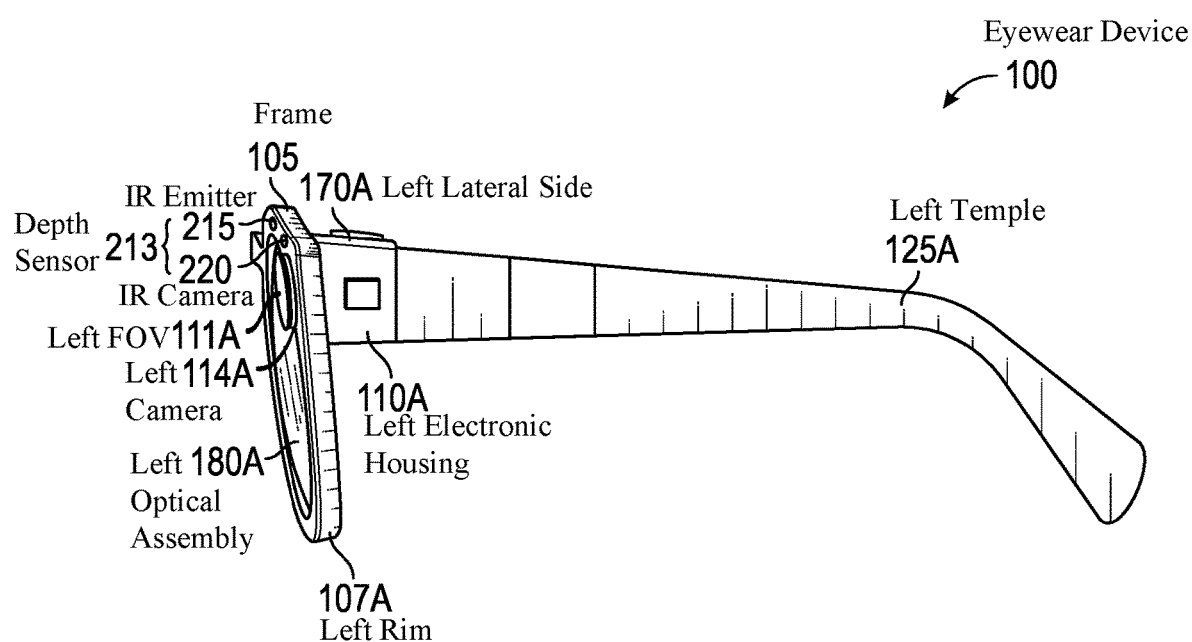
FIG. 2A is a side view of another example hardware configuration of an eyewear device utilized in the camera misalignment compensation system, which shows the right visible light camera and a depth sensor of the depth-capturing camera to generate an initial depth image of a sequence of initial depth images (e.g., in an initial video).

FIG. 2A is a side view of another example hardware configuration of an eyewear device 100 utilized in the camera misalignment compensation system. As shown, the depth-capturing camera includes a left visible light camera 114A and a depth sensor 213 on a frame 105 to generate an initial depth image of a sequence of initial depth images (e.g., in an initial video). Instead of utilizing at least two visible light cameras 114A and 114B to generate the initial depth image, here a single visible light camera 114A and the depth sensor 213 are utilized to generate depth images. The infrared camera 220 of the depth sensor 213 has an outward facing field of view that substantially overlaps with the left visible light camera 114A for a line of sight of the eye of the user. As shown, the infrared emitter 215 and the infrared camera 220 are co-located on the upper portion of the left rim 107A with the left visible light camera 114A.

In the example of FIG. 2A, the depth sensor 213 of the eyewear device 100 includes an infrared emitter 215 and an infrared camera 220 which captures an infrared image. Visible light cameras 114A and 114B typically include a blue light filter to block infrared light detection, in an example, the infrared camera 220 is a visible light camera, such as a low resolution video graphic array (VGA) camera (e.g., 640×480 pixels for a total of 0.3 megapixels), with the blue filter removed. The infrared emitter 215 and the infrared camera 220 are co-located on the frame 105, for example, both are shown as connected to the upper portion of the left rim 107A. As described in further detail below, the frame 105 or one or more of the left and right electronic housings 110A and 110B include a circuit board that includes the infrared emitter 215 and the infrared camera 220. The infrared emitter 215 and the infrared camera 220 can be connected to the circuit board by soldering, for example.

Other arrangements of the infrared emitter 215 and infrared camera 220 can be implemented, including arrangements in which the infrared emitter 215 and infrared camera 220 are both on the right rim 107A, or in different locations on the frame 105, for example, the infrared emitter 215 is on the left rim 107B and the infrared camera 220 is on the right rim 107B. However, the at least one visible light camera 114A and the depth sensor 213 typically have substantially overlapping fields of view to generate three-dimensional depth images. In another example, the infrared emitter 215 is on the frame 105 and the infrared camera 220 is on one of the electronic housings 110A and 110B, or vice versa. The infrared emitter 215 can be connected essentially anywhere on the frame 105, left electronic housing 110A, or right electronic housing 110B to emit a pattern of infrared in the light of sight of the eye of the user. Similarly, the infrared camera 220 can be connected essentially anywhere on the frame 105, left electronic housing 110A, or right electronic housing 110B to capture at least one reflection variation in the emitted pattern of infrared light of a three-dimensional scene in the light of sight of the eye of the user.

The infrared emitter 215 and infrared camera 220 are arranged to face outwards to pick up an infrared image of a scene with objects or object features that the user wearing the eyewear device 100 observes. For example, the infrared emitter 215 and infrared camera 220 are positioned directly in front of the eye, in the upper part of the frame 105 or in the electronic housings 110A and 110B at either ends of the frame 105 with a forward facing field of view to capture images of the scene which the user is gazing at, for measurement of depth of objects and object features.

In one example, the infrared emitter 215 of the depth sensor 213 emits infrared light illumination in the forward-facing field of view of the scene, which can be near-infrared light or other short-wavelength beam of low-energy radiation. Alternatively, or additionally, the depth sensor 213 may include an emitter that emits other wavelengths of light besides infrared and the depth sensor 213 further includes a camera sensitive to that wavelength that receives and captures images with that wavelength. As noted above, the eyewear device 100 is coupled to a processor and a memory, for example in the eyewear device 100 itself or another part of the camera misalignment compensation system. Eyewear device 100 or the camera misalignment compensation system can subsequently process the captured infrared image during generation of three-dimensional depth images of the depth videos, such as the initial depth images from the initial video.

Figure 2B:
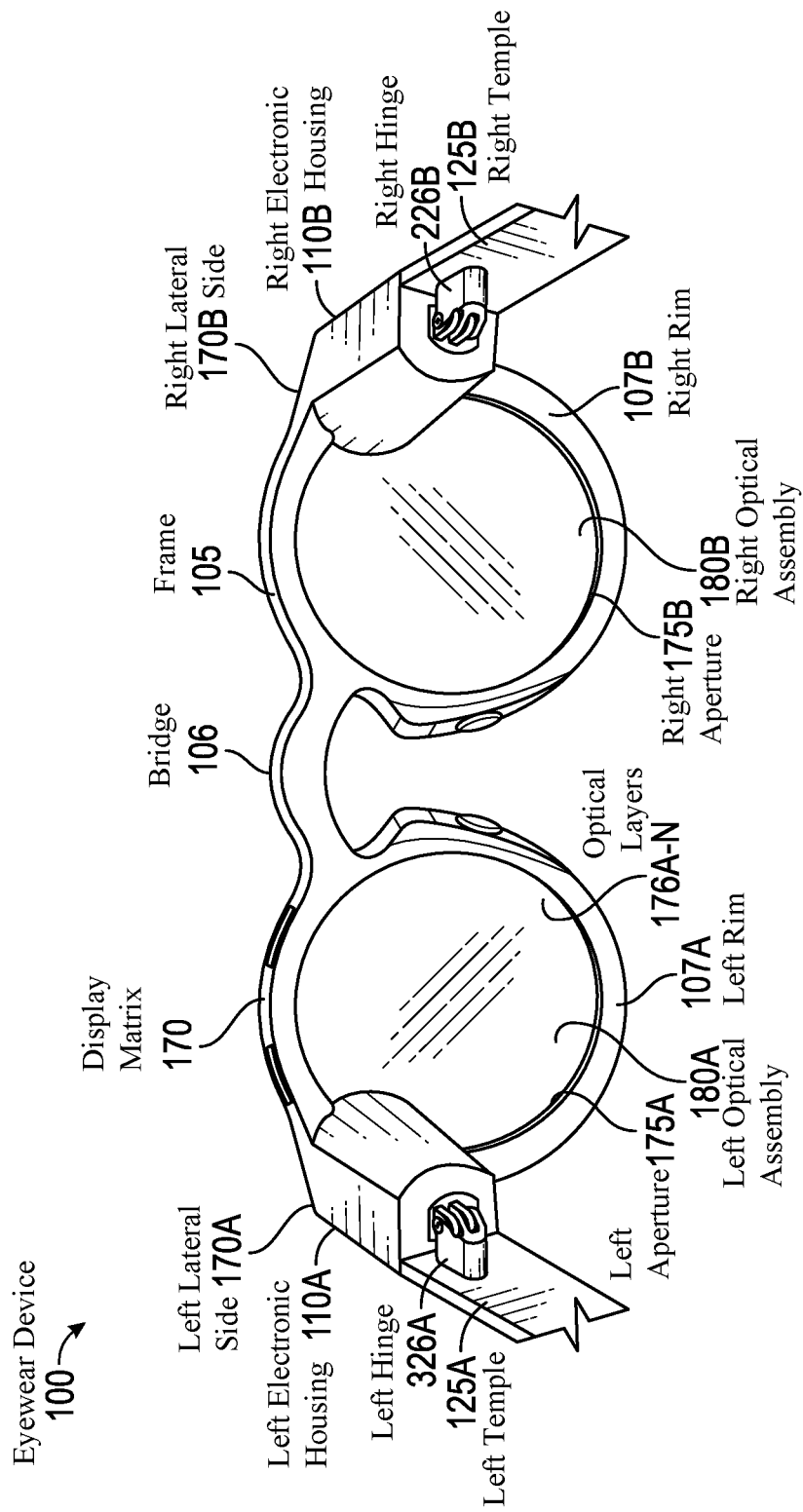
FIGS. 2B and 2C are rear views of example hardware configurations of the eyewear device, including two different types of image displays.
Figure 2C:
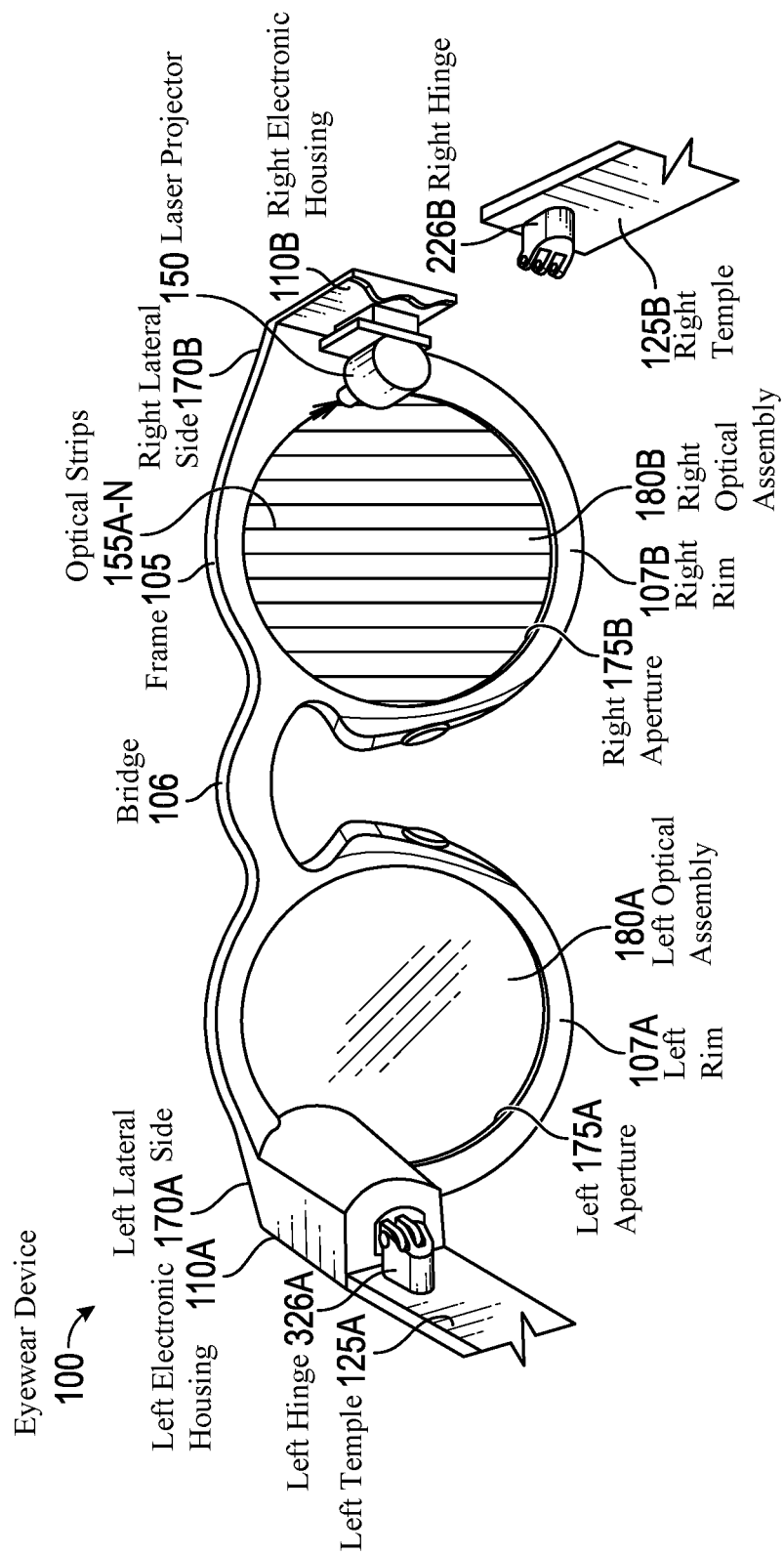

FIGS. 2B and 2C are rear views of example hardware configurations of the eyewear device 100, including two different types of image displays. Eyewear device 100 is in a form configured for wearing by a user, which are eyeglasses in the example. The eyewear device 100 can take other forms and may incorporate other types of frameworks, for example, a headgear, a headset, or a helmet.

In the eyeglasses example, eyewear device 100 includes a frame 105 including a left rim 107A connected to a right rim 107B via a bridge 106 adapted for a nose of the user. The left and right rims 107A-B include respective apertures 175A and 175B which hold a respective optical element 180A and 180B, such as a lens and a display device. As used herein, the term lens is meant to cover transparent or translucent pieces of glass or plastic having curved and/or flat surfaces that cause light to converge/diverge or that cause little or no convergence or divergence.

Although shown as having two optical elements 180A and 180B, the eyewear device 100 can include other arrangements, such as a single optical element or may not include any optical element 180A and 180B depending on the application or intended user of the eyewear device 100. As further shown, eyewear device 100 includes a left electronic housing 110A (including a left camera 114A) adjacent the left lateral side 170A of the frame 105 and a right electronic housing 110B (including a right camera 114B) adjacent the right lateral side 170B of the frame 105. The electronic housings 110A and 110B may be integrated into the frame 105 on the respective sides 170A and 170B (as illustrated) or implemented as separate components attached to the frame 105 on the respective sides 170A and 170B. Alternatively, the electronic housings 110A and 110B may be integrated into temples (not shown) attached to the frame 105.

In one example, the image display of the optical assembly 180A and 180B includes an integrated image display. As shown in FIG. 2B, the optical assembly 180A and 180B includes a suitable display matrix 170 of any suitable type, such as a liquid crystal display (LCD), an organic light-emitting diode (OLED) display, or any other such display. The optical assembly 180A and 180B also includes an optical layer or layers 176, which can include lenses, optical coatings, prisms, mirrors, waveguides, optical strips, and other optical components in any combination.

The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A and 175B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the display matrix 170, and the light travels through the prism so that the image viewed from the second surface is larger in one or more dimensions than the image emitted from the display matrix 170.

In another example, the image display device of optical assembly 180A and 180B includes a projection image display as shown in FIG. 2C. The optical assembly 180A and 180B includes a laser projector 150, which is a three-color laser projector using a scanning mirror or galvanometer. During operation, an optical source such as a laser projector 150 is disposed in or on one of the temples 125A and 125B of the eyewear device 100. Optical assembly 180A and 180B includes one or more optical strips 155A-N spaced apart across the width of the lens of the optical assembly 180A and 180B or across a depth of the lens between the front surface and the rear surface of the lens.

As the photons projected by the laser projector 150 travel across the lens of the optical assembly 180A and 180B, the photons encounter the optical strips 155A-N. When a photon encounters an optical strip, the photon is either redirected towards the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A and 180B, the eyewear device 100 can include other arrangements, such as a single or three optical assemblies, or the optical assembly 180A and 180B may have a different arrangement depending on the application or intended user of the eyewear device 100.

As further shown in FIGS. 2B and 2C, the electronic housings 110A and 110B may be integrated into the frame 105 on the respective lateral sides 170A and 170B (as illustrated) or implemented as separate components attached to the frame 105 on the respective sides 170A and 170B. Alternatively, the electronic housings 110A and 110B may be integrated into temples 125A and 125B attached to the frame 105.

In one example, the image display includes a first (left) image display and a second (right) image display. Eyewear device 100 includes first and second apertures 175A and 175B which hold a respective first and second optical assembly 180A and 180B. The first optical assembly 180A includes the first image display (e.g., a display matrix 170A of FIG. 2B; or optical strips 155A-N' and a projector 150A of FIG. 2C). The second optical assembly 180B includes the second image display e.g., a display matrix 170B of FIG. 2B; or optical strips 155A-N" and a projector 150B of FIG. 2C).

Figure 3:
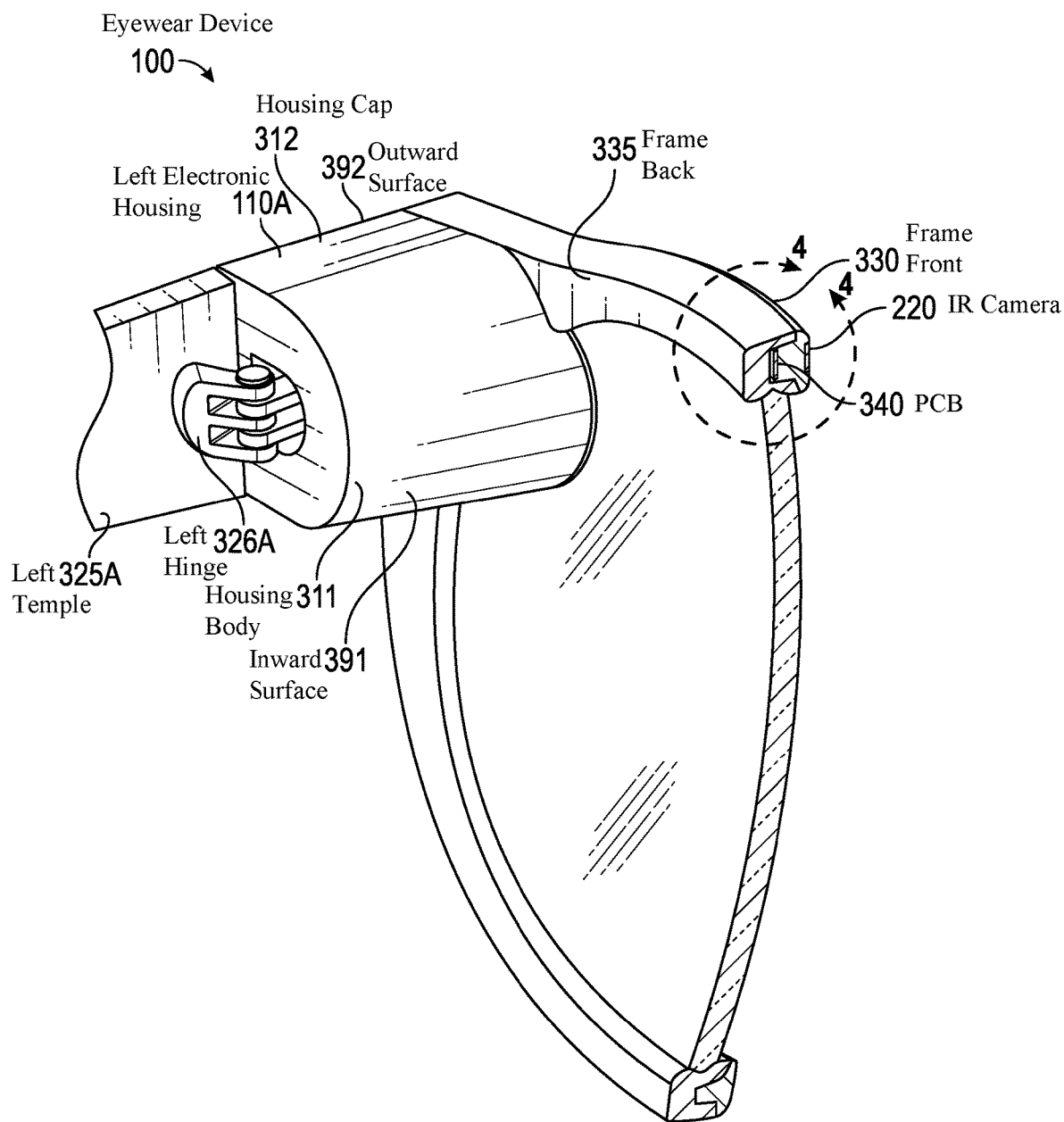
FIG. 3 shows a rear perspective sectional view of the eyewear device of FIG. 2A depicting an infrared camera of the depth sensor, a frame front, a frame back, and a circuit board.

FIG. 3 shows a rear perspective sectional view of the eyewear device of FIG. 2A depicting an infrared camera 220, a frame front 330, a frame back 335, and a circuit board. The upper portion of the left rim 107A of the frame 105 of the eyewear device 100 includes a frame front 330 and a frame back 335. The frame front 330 includes a front-facing side configured to face outward away from the eye of the user. The frame back 335 includes a rear-facing side configured to face inward toward the eye of the user. An opening for the infrared camera 220 is formed on the frame front 330.

As shown in the encircled cross-section 4-4 of the upper middle portion of the left rim 107A of the frame 105, a circuit board, which is a flexible printed circuit board (PCB) 340, is sandwiched between the frame front 330 and the frame back 335. Also shown in further detail is the attachment of the left electronic housing 110A to the left temple 325A via a left hinge 326A. In some examples, components of the depth sensor 213, including the infrared camera 220, the flexible PCB 340, or other electrical connectors or contacts may be located on the left temple 325A or the left hinge 326A.

In an example, the left electronic housing 110A includes an electronic housing body 311, an electronic housing cap 312, an inward facing surface 391 and an outward facing surface 392 (labeled, but not visible). Disposed inside the left electronic housing 110A are various interconnected circuit boards, such as PCBs or flexible PCBs, which include controller circuits for charging a battery, inwards facing light emitting diodes (LEDs), and outwards (forward) facing LEDs. Although shown as being formed on the circuit boards of the left rim 107A, the depth sensor 213, including the infrared emitter 215 and the infrared camera 220, can be formed on the circuit boards of the right rim 107B to captured infrared images utilized in the generation of three-dimensional depth images or depth videos, for example, in combination with right visible light camera 114B.

Figure 4:
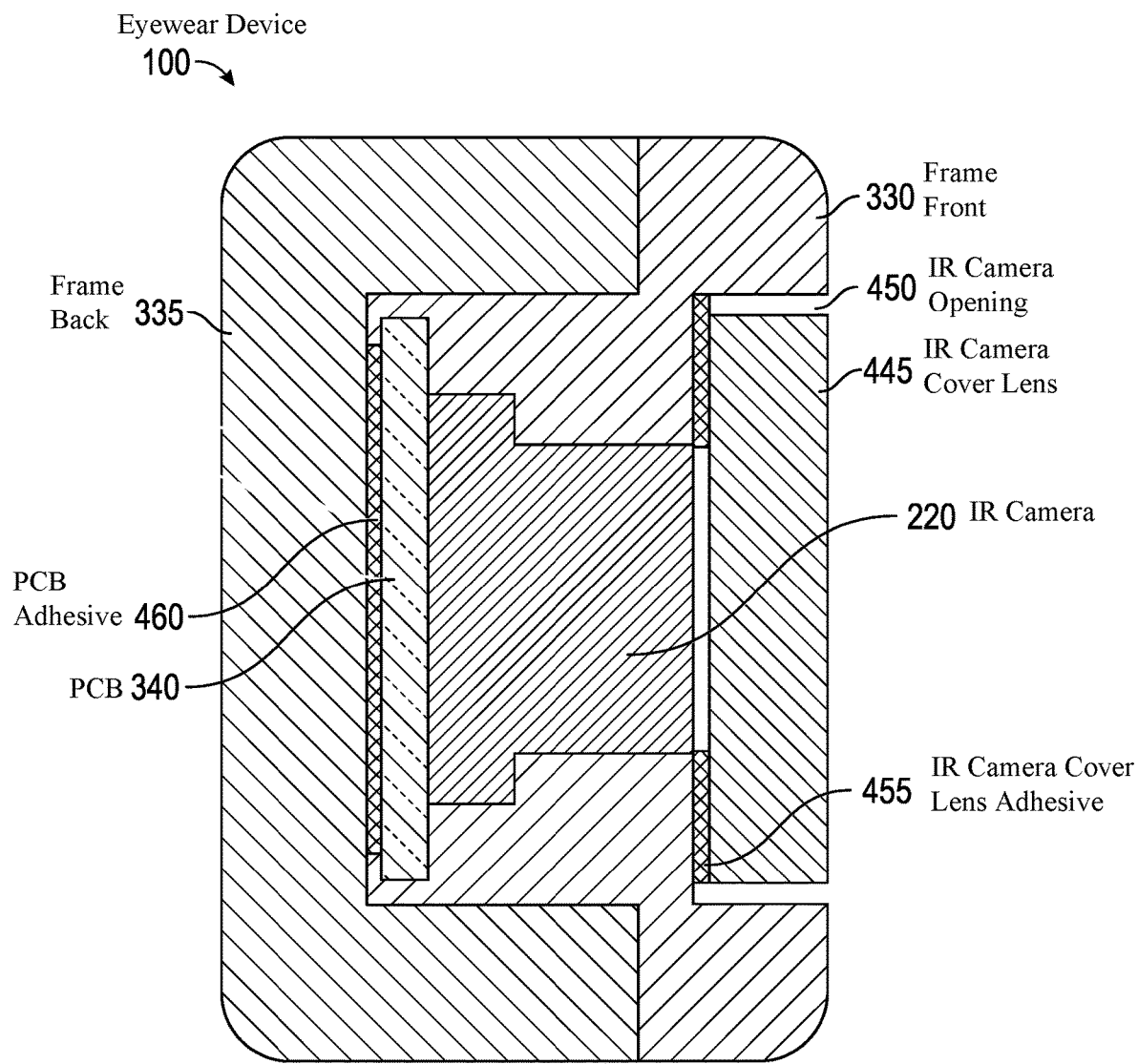
FIG. 4 is a cross-sectional view taken through the infrared camera and the frame of the eyewear device of FIG. 3.

FIG. 4 is a cross-sectional view through the infrared camera 220 and the frame corresponding to the encircled cross-section 4-4 of the eyewear device of FIG. 3. Various layers of the eyewear device 100 are visible in the cross-section of FIG. 4. As shown, the flexible PCB 340 is disposed on the frame back 335 and connected to the frame front 330. The infrared camera 220 is disposed on the flexible PCB 340 and covered by an infrared camera cover lens 445. For example, the infrared camera 220 is reflowed to the back of the flexible PCB 340. Reflowing attaches the infrared camera 220 to electrical contact pad(s) formed on the back of the flexible PCB 340 by subjecting the flexible PCB 340 to controlled heat which melts a solder paste to connect the two components. In one example, reflowing is used to surface mount the infrared camera 220 on the flexible PCB 340 and electrically connect the two components. However, through-holes can be used to connect leads from the infrared camera 220 to the flexible PCB 340 via interconnects, for example.

The frame front 330 includes an infrared camera opening 450 for the infrared camera cover lens 445. The infrared camera opening 450 is formed on a front-facing side of the frame front 330 that is configured to face outwards away from the eye of the user and towards a scene being observed by the user. In the example, the flexible PCB 340 can be connected to the frame back 335 via a flexible PCB adhesive 460. The infrared camera cover lens 445 can be connected to the frame front 330 via infrared camera cover lens adhesive 455. The connection can be indirect via intervening components.

Figure 5:
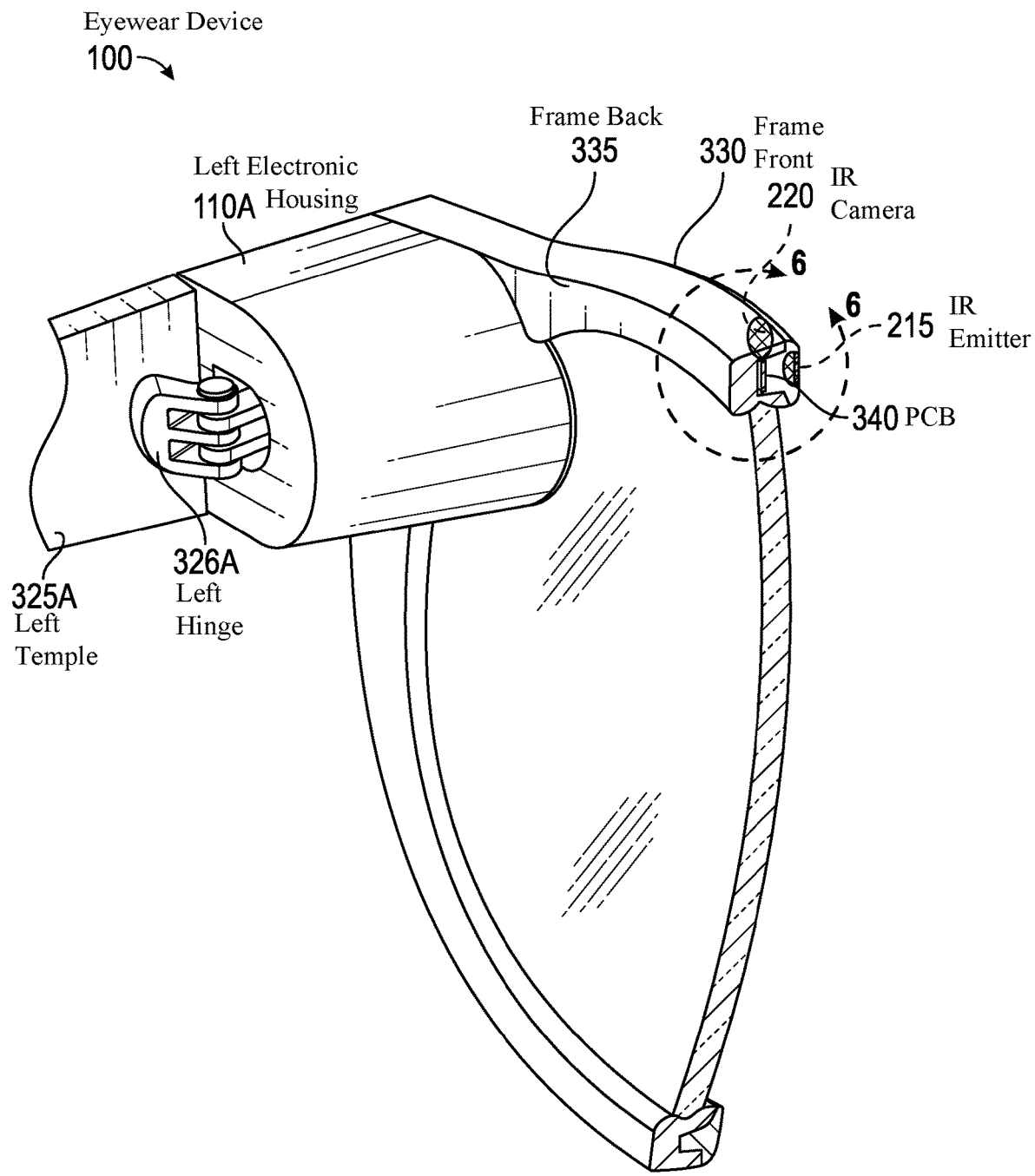
FIG. 5 shows a rear perspective view of the eyewear device of FIG. 2A depicting an infrared emitter of the depth sensor, the infrared camera of the depth sensor, the frame front, the frame back, and the circuit board.

FIG. 5 shows a rear perspective view of the eyewear device of FIG. 2A. The eyewear device 100 includes an infrared emitter 215, infrared camera 220, a frame front 330, a frame back 335, and a circuit board 340. As in FIG. 3, it can be seen in FIG. 5 that the upper portion of the left rim of the frame of the eyewear device 100 includes the frame front 330 and the frame back 335. An opening for the infrared emitter 215 is formed on the frame front 330.

As shown in the encircled cross-section 6-6 in the upper middle portion of the left rim of the frame, a circuit board, which is a flexible PCB 340, is sandwiched between the frame front 330 and the frame back 335. Also shown in further detail is the attachment of the left electronic housing 110A to the left temple 325A via the left hinge 326A. In some examples, components of the depth sensor 213, including the infrared emitter 215, the flexible PCB 340, or other electrical connectors or contacts may be located on the left temple 325A or the left hinge 326A.

Figure 6:
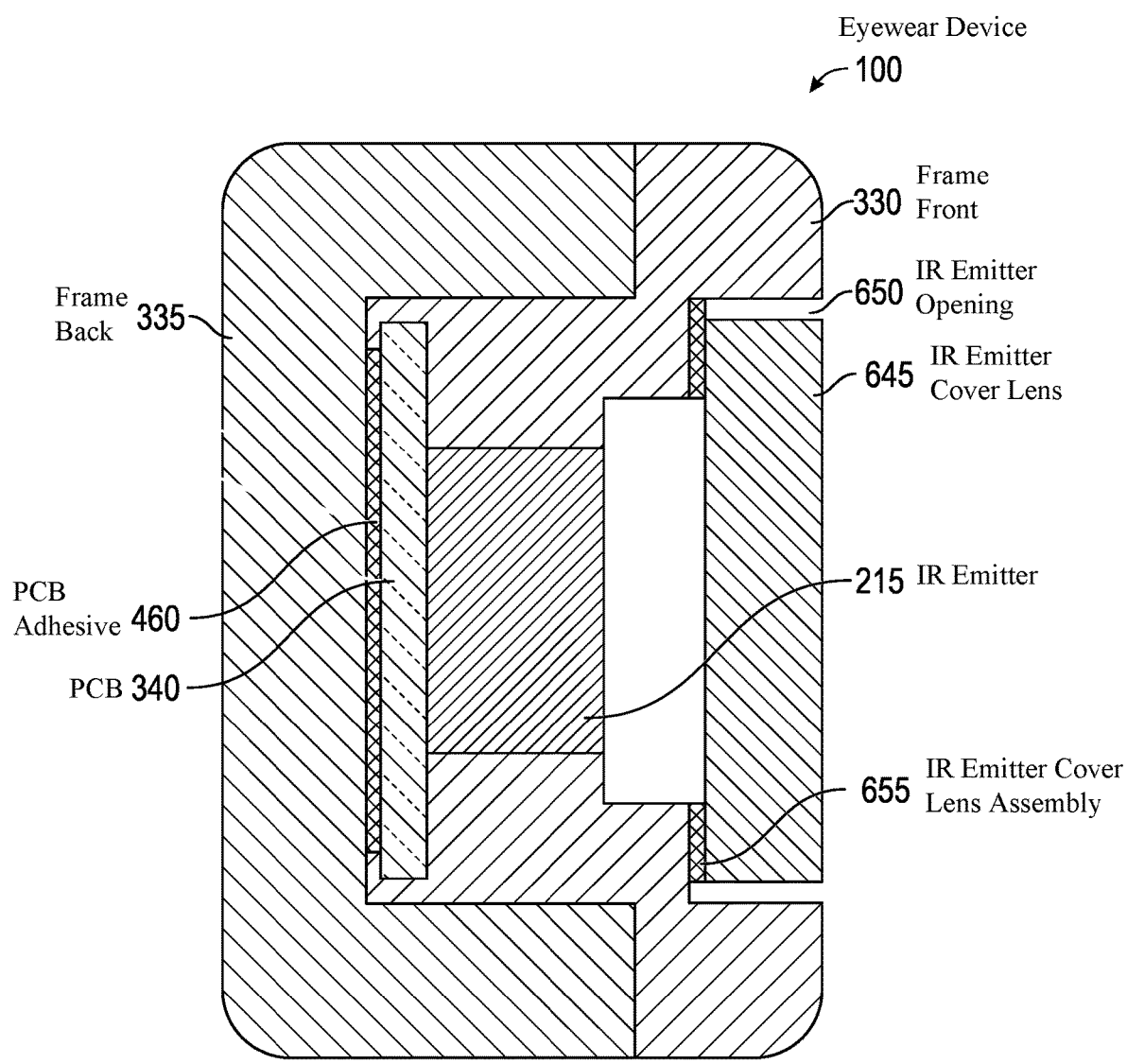
FIG. 6 is a cross-sectional view taken through the infrared emitter and the frame of the eyewear device of FIG. 5.

FIG. 6 is a cross-sectional view through the infrared emitter 215 and the frame corresponding to the encircled cross-section 6-6 of the eyewear device of FIG. 5. Multiple layers of the eyewear device 100 are illustrated in the cross-section of FIG. 6, as shown the frame 105 includes the frame front 330 and the frame back 335. The flexible PCB 340 is disposed on the frame back 335 and connected to the frame front 330. The infrared emitter 215 is disposed on the flexible PCB 340 and covered by an infrared emitter cover lens 645. For example, the infrared emitter 215 is reflowed to the back of the flexible PCB 340. Reflowing attaches the infrared emitter 215 to contact pad(s) formed on the back of the flexible PCB 340 by subjecting the flexible PCB 340 to controlled heat which melts a solder paste to connect the two components. In one example, reflowing is used to surface mount the infrared emitter 215 on the flexible PCB 340 and electrically connect the two components. However, through-holes can be used to connect leads from the infrared emitter 215 to the flexible PCB 340 via interconnects, for example.

The frame front 330 includes an infrared emitter opening 650 for the infrared emitter cover lens 645. The infrared emitter opening 650 is formed on a front-facing side of the frame front 330 that is configured to face outwards away from the eye of the user and towards a scene being observed by the user. In the example, the flexible PCB 340 can be connected to the frame back 335 via the flexible PCB adhesive 460. The infrared emitter cover lens 645 can be connected to the frame front 330 via infrared emitter cover lens adhesive 655. The coupling can also be indirect via intervening components.

Figure 7:
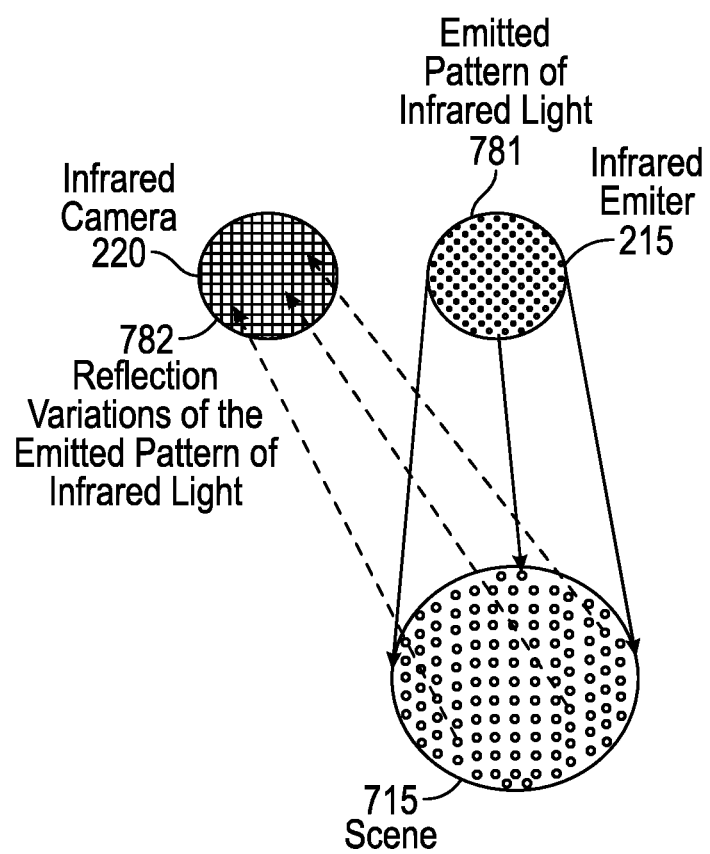
FIG. 7 depicts an example of a pattern of infrared light emitted by the infrared emitter of the depth sensor and reflection variations of the emitted pattern of infrared light captured by the infrared camera of the depth sensor of the eyewear device to measure depth of pixels in a raw image to generate the initial depth images from the initial video.

FIG. 7 depicts an example of an emitted pattern of infrared light 781 emitted by an infrared emitter 215 of the depth sensor 213. As shown, reflection variations of the emitted pattern of infrared light 782 are captured by the infrared camera 220 of the depth sensor 213 of the eyewear device 100 as an infrared image. The reflection variations of the emitted pattern of infrared light 782 is utilized to measure depth of pixels in a raw image (e.g., left raw image) to generate three-dimensional depth images, such as the initial depth images of a sequence of initial depth images (e.g., in an initial video).

Depth sensor 213 in the example includes the infrared emitter 215 to project a pattern of infrared light and the infrared camera 220 to capture infrared images of distortions of the projected infrared light by objects or object features in a space, shown as scene 715 being observed by the wearer of the eyewear device 100. The infrared emitter 215, for example, may blast infrared light 781 which falls on objects or object features within the scene 715 like a sea of dots. In some examples, the infrared light is emitted as a line pattern, a spiral, or a pattern of concentric rings or the like. Infrared light is typically not visible to the human eye. The infrared camera 220 is like a standard red, green, and blue (RGB) camera but receives and captures images of light in the infrared wavelength range. For depth sensing, the infrared camera 220 is coupled to an image processor (element 912 of FIG. 9) and the camera misalignment compensation programming (element 945) that judge time of flight based on the captured infrared image of the infrared light. For example, the distorted dot pattern 782 in the captured infrared image can then be processed by an image processor to determine depth from the displacement of dots. Typically, nearby objects or object features have a pattern with dots spread further apart and far away objects have a denser dot pattern. The foregoing functionality can be embodied in programming instructions of camera misalignment compensation system programming or application (element 945) found in one or more components of the system.

FIG. 8A depicts an example of infrared light captured by the infrared camera 220 of the depth sensor 213 with a left infrared camera field of view 812. Infrared camera 220 captures reflection variations in the emitted pattern of infrared light 782 in the three-dimensional scene 715 as an infrared image 859. As further shown, visible light is captured by the left visible light camera 114A with a left visible light camera field of view 111A as a left raw image 858A. Based on the infrared image 859 and left raw image 858A, the three-dimensional initial depth image of the three-dimensional scene 715 is generated.

Figure 8B:
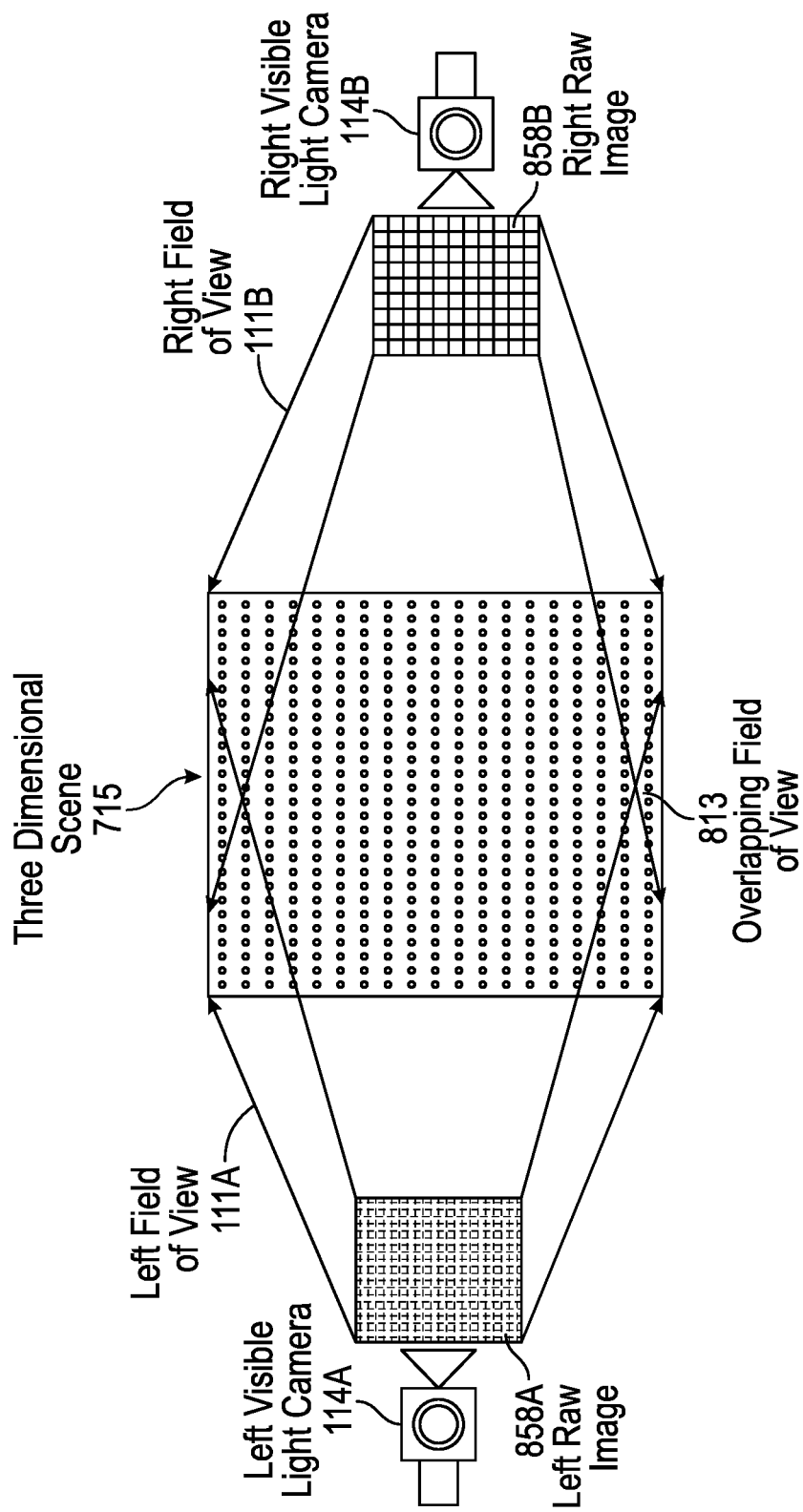
FIG. 8B depicts an example of visible light captured by the left visible light camera as left raw image and visible light captured by the right visible light camera as a right raw image to generate the initial depth image of a three-dimensional scene.

FIG. 8B depicts an example of visible light captured by the left visible light camera 114A and visible light captured with a right visible light camera 114B. Visible light is captured by the left visible light camera 114A with a left visible light camera field of view 111A as a left raw image 858A. Visible light is captured by the right visible light camera 114B with a right visible light camera field of view 111B as a right raw image 858B. Based on the left raw image 858A and the right raw image 858B, the three-dimensional initial depth image of the three-dimensional scene 715 is generated.

Figure 8C:
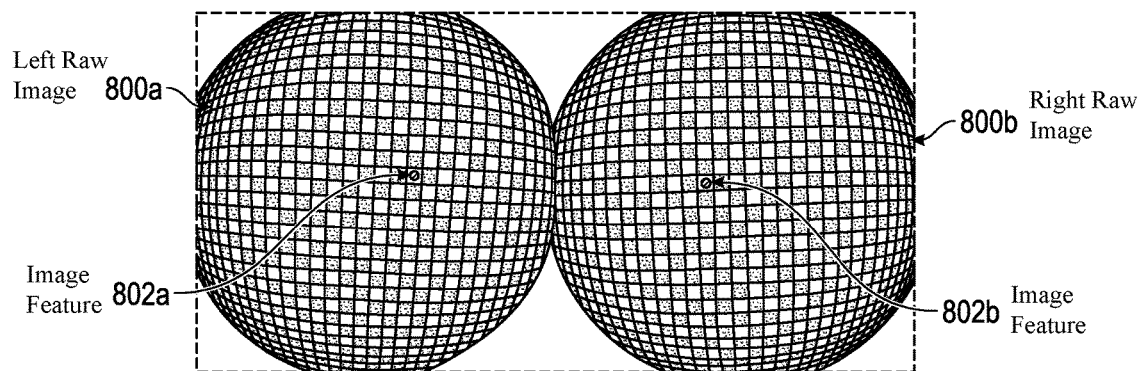
FIG. 8C depicts initial images captured using visible light cameras.

FIG. 8C depicts initial images captured using visible light cameras. A left visible light camera (e.g., camera 114A) captures a left raw image 800a including an image feature 802a of a feature within a scene and a right visible light camera (e.g., camera 114B) captures a right raw image 800b including an image feature 802b of the same feature within the scene. Misalignment of the cameras (e.g., due to manufacturing tolerances) results in the image feature 802a being slightly offset in the Y-direction (i.e., vertical direction) with respect to the image feature 802b.

Figure 8D:
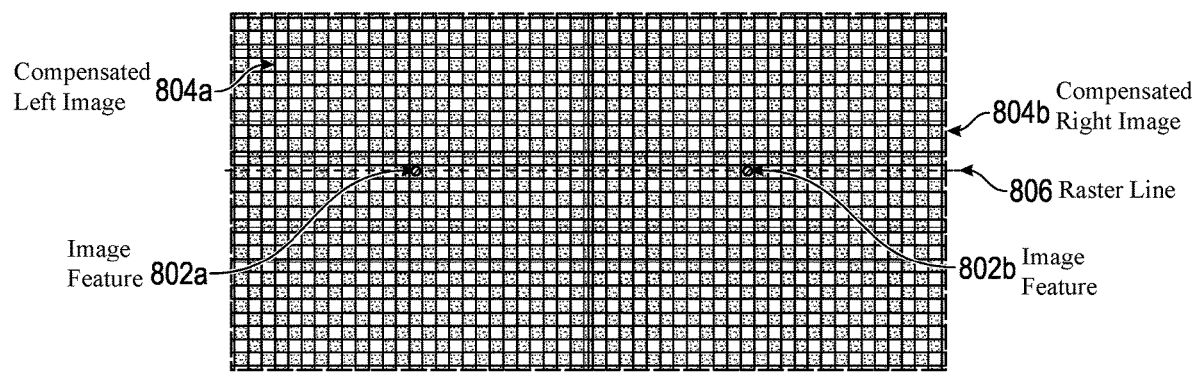
FIG. 8D depicts the images of FIG. 8C after rectification and compensation to obtain calibrated images.

FIG. 8D depicts a rectified and compensated left image 804a and a rectified and compensated right image 804b. A transformation function 965 rectifies the images and the camera misalignment and compensation system described herein compensates for misalignment between the rectified left raw image 800a and the right raw image 800b to obtain the rectified and compensated left image 804a and right image 804b. As seen in FIG. 8D, the image feature 802a and 802b lie on the same raster line 806, which facilitates matching image features to determine offset in the horizontal direction for use in three-dimensional rendering.

Figure 8F:
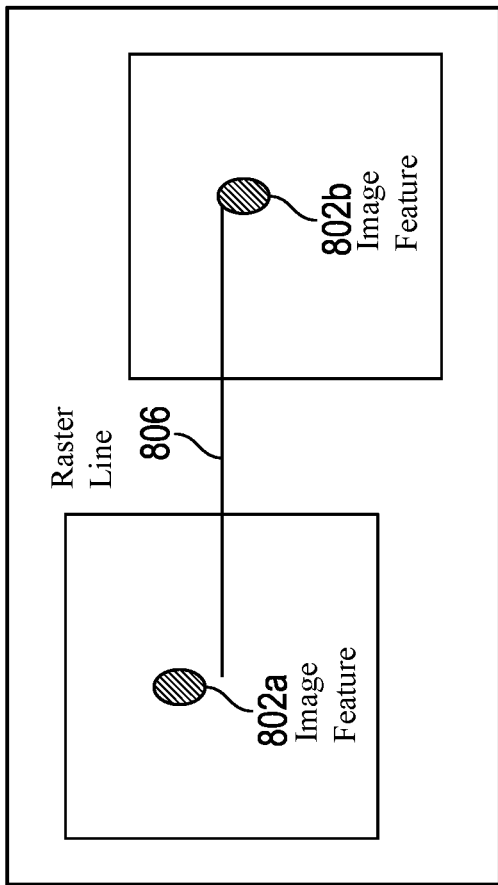
FIG. 8F depicts images captured by a stereoscopic camera system in a static system where the cameras of the camera system have different pitch angles.
Figure 8G:
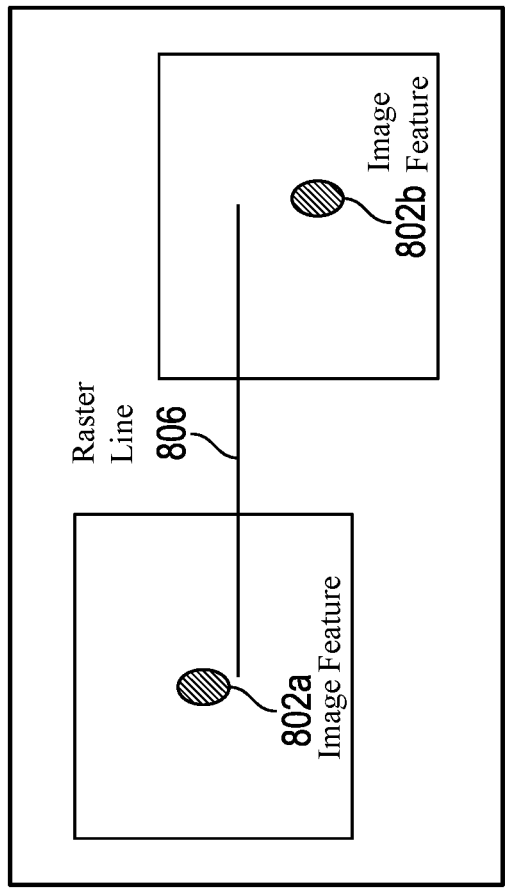
FIG. 8G depicts images captured by a stereo camera system in a dynamic system where the cameras of the camera system have different pitch angles and the camera is moving vertically.
Figure 8E:
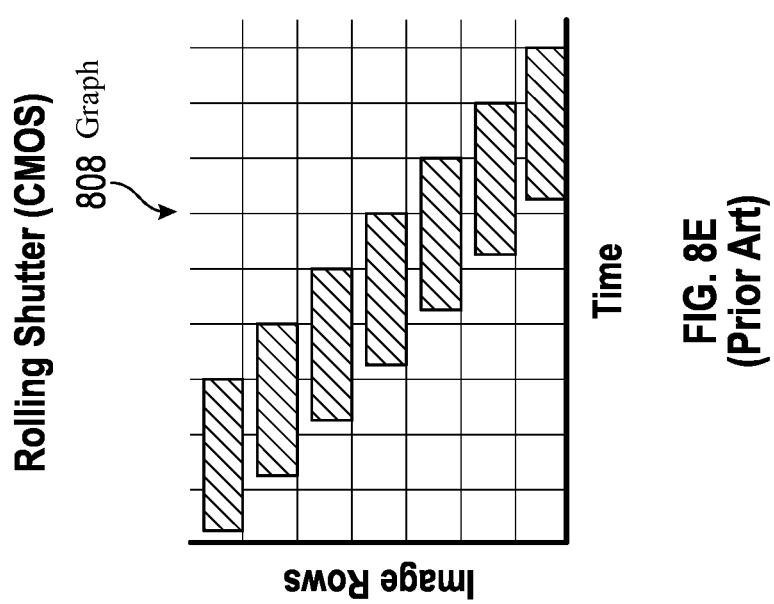
FIG. 8E depicts a graph showing readout times for image rows for a camera having a rolling shutter in accordance with the prior art.

FIG. 8E depicts a graph 808 showing readout times for image rows for a sensor/camera having a rolling shutter in accordance with the prior art. As seen in FIG. 8E, in a rolling shutter camera system, image rows are read out at different times (represented by the solid vertical bars in the graph 808.

FIG. 8F depicts images captured by a stereoscopic camera system in a static system (e.g., the cameras and the scene being imaged are not moving in relation to one another) where the cameras of the camera system have different pitch angles. As illustrated in FIG. 8F, the orientation of the left camera (e.g., camera 114A) has a pitch offset with respect to the orientation of the right camera (e.g., camera 114B). The pitch offset results in the image feature 802a being above a raster line 805 and the image feature 802b being below the raster line. Due to the rolling shutter illustrated in FIG. 8E, this may result in the image features being read out of their respective cameras at different times with respect to their expected readouts after synchronization.

FIG. 8G depicts images captured by a stereoscopic camera system in a dynamic system (e.g., the cameras and/or the scene being imaged are moving in relation to one another) where the cameras of the camera system have different pitch angles (e.g., the same pitch angle difference as seen in FIG. 8F). As illustrated in FIG. 8G, the orientation of the left camera (e.g., camera 114A) has a pitch offset with respect to the orientation of the right camera (e.g., camera 114B). The pitch offset and the dynamic movement results in the image feature 802a being even farther below the raster line 806 than in FIG. 8F. Due to the rolling shutter illustrated in FIG. 8E, this may result in the image features being read out of their respective cameras at an even greater amount of times with respect to their expected readouts after synchronization. The amount of time may be greater than tolerances built into the system, thereby preventing matching of features for three-dimensional rendering. In an example, a pitch offset of 3.56 degrees may result in a range of 40-75 pixels. Examples described herein adjust the synchronization to account for the pitch offset in order to remove differences in readout times, thus improving the systems ability to match features in stereoscopic images.

Figure 9:
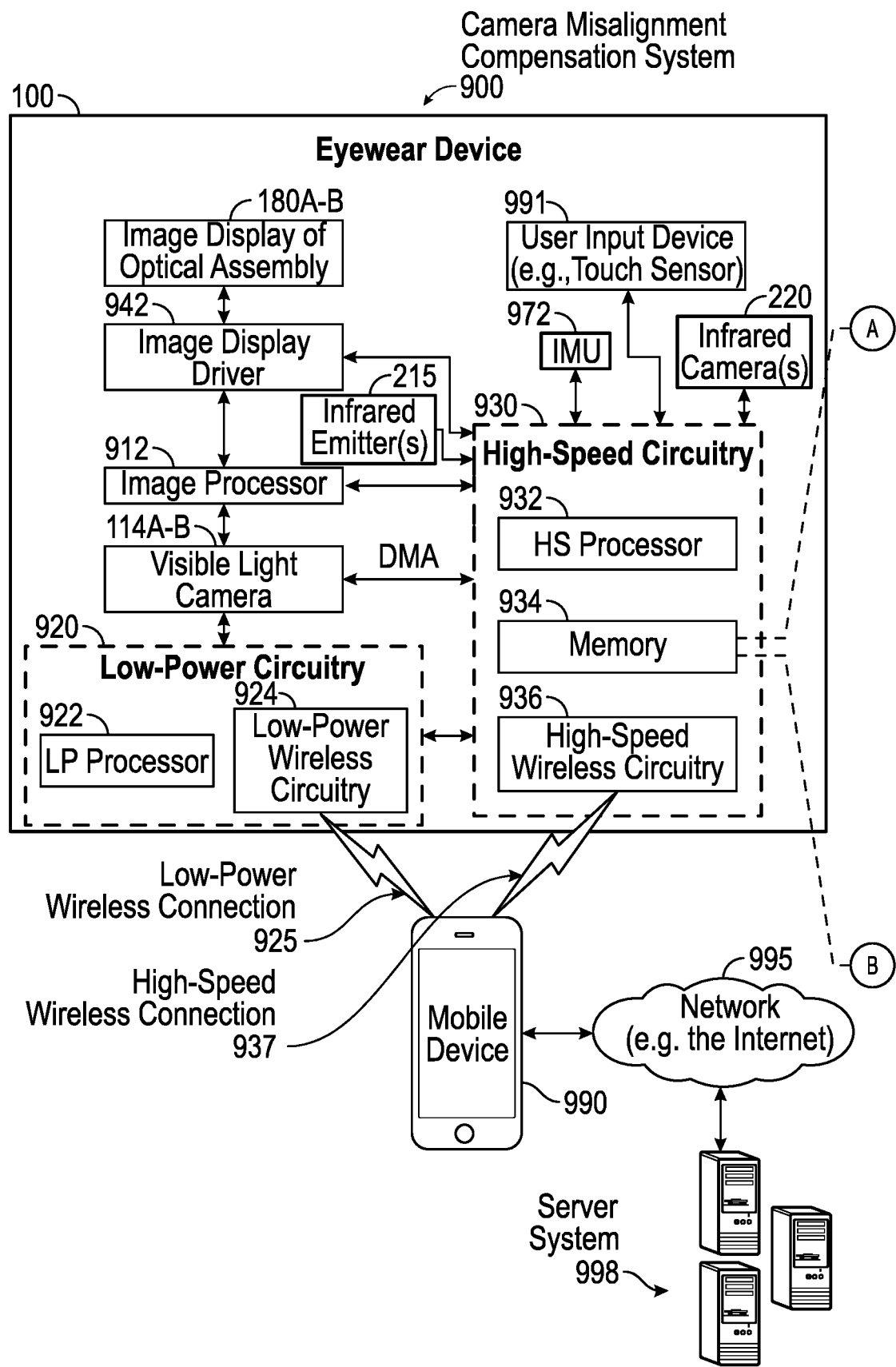
FIG. 9 is a high-level functional block diagram of an example camera misalignment compensation system including the eyewear device with a depth-capturing camera to generate initial depth images, a mobile device, and a server system connected via various networks.
Figure 9:
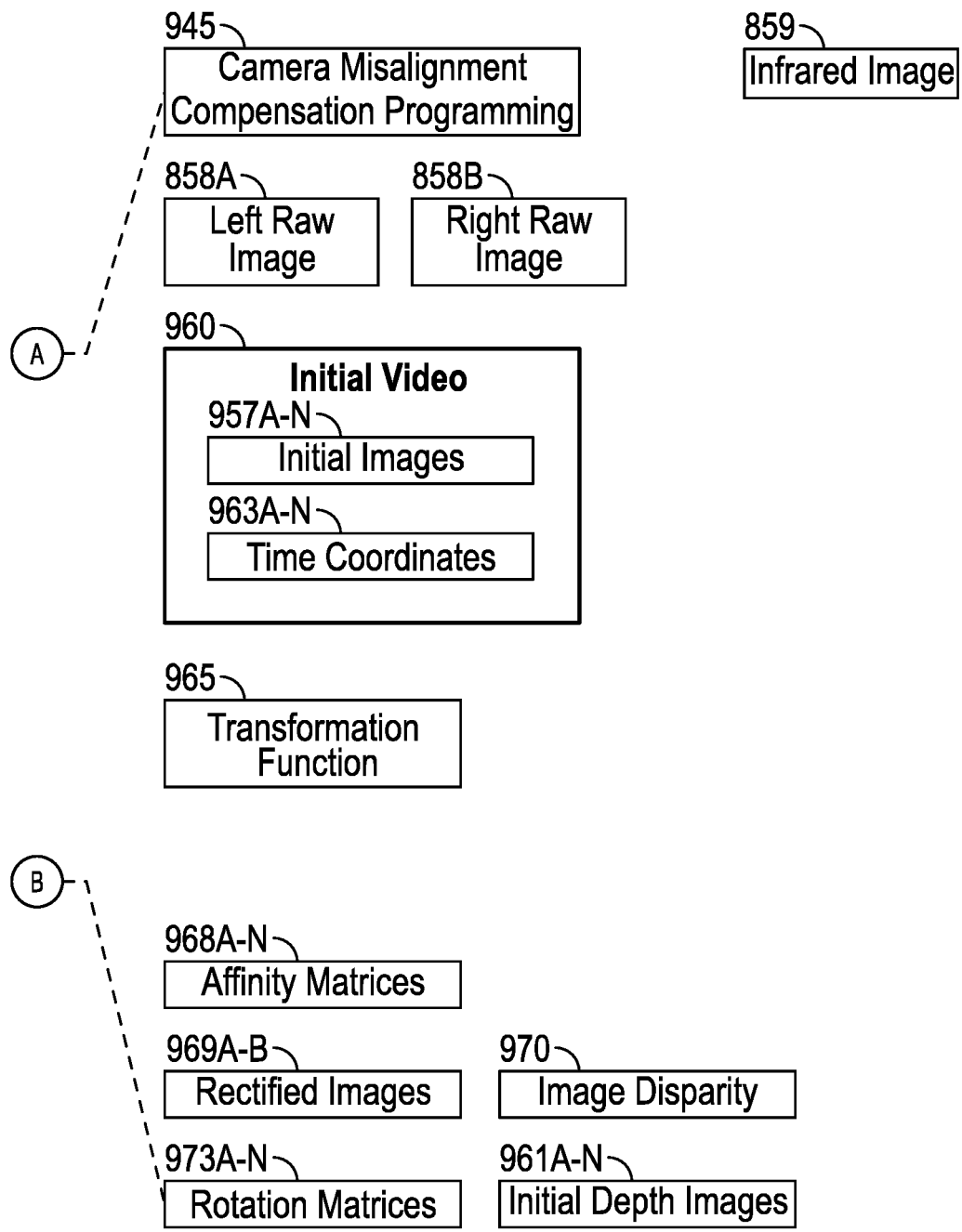

FIG. 9 is a high-level functional block diagram of an example camera misalignment compensation system 900, which includes a wearable device (e.g., the eyewear device 100), a mobile device 990, and a server system 998 connected via various networks. Eyewear device 100 includes an input parameter processor and a depth-capturing camera, such as at least one of the visible light cameras 114A and 114B; and the depth sensor 213, shown as infrared emitter 215 and infrared camera 220. The depth-capturing camera can alternatively include at least two visible light cameras 114A and 114B (one associated with the left lateral side 170A and one associated with the right lateral side 170B). Depth-capturing camera generates initial depth images 961A-N of initial video 960, which are rendered three-dimensional (3D) models that are texture mapped images of red, green, and blue (RGB) imaged scenes. A transformation function 965 within the wearable device rectifies the initial images, e.g., to facilitate matching of features and to format the images for viewing.

Mobile device 990 may be a smartphone, tablet, laptop computer, access point, or any other such device capable of connecting with eyewear device 100 using both a low-power wireless connection 925 and a high-speed wireless connection 937. Mobile device 990 is connected to server system 998 and network 995. The network 995 may include any combination of wired and wireless connections.

Eyewear device 100 further includes two image displays of the optical assembly 180A and 180B (one associated with the left lateral side 170A and one associated with the right lateral side 170B). Eyewear device 100 also includes image display driver 942, image processor 912, low-power circuitry 920, and high-speed circuitry 930. Image display of optical assembly 180A and 180B are for presenting images and videos, which can include a sequence of depth images, such as the initial depth images 961A-N from the initial video 960. Image display driver 942 is coupled to the image display of optical assembly 180A and 180B to control the image display of optical assembly 180A and 180B to present the video including images, such as, for example, the initial depth images 961A-N of initial video 960. Eyewear device 100 further includes a user input device 991 (e.g., touch sensor) to receive input and selections from a user.

The components shown in FIG. 9 for the eyewear device 100 are located on one or more circuit boards, for example a PCB or flexible PCB, in the rims or temples. Alternatively, or additionally, the depicted components can be in the electronic housings, frames, hinges, or bridge of the eyewear device 100. Left and right visible light cameras 114A and 114B can include digital camera elements such as a complementary metal-oxide-semiconductor (CMOS) image sensor, charge coupled device, a lens, or any other respective visible or light capturing elements that may be used to capture data, including images of scenes with unknown objects.

Eyewear device 100 includes a memory 934 which includes input parameter programming and camera misalignment compensation programming 945 to perform a subset or all the functions described herein for camera misalignment compensation. As shown, memory 934 further includes a left raw image 858A captured by left visible light camera 114A, a right raw image 858B captured by right visible light camera 114B, and an infrared image 859 captured by infrared camera 220 of the depth sensor 213.

As shown, eyewear device 100 includes an orientation sensor, which includes, for example, an inertial measurement unit (IMU) 972 as depicted. Generally, an inertial measurement unit 972 is an electronic device that measures and reports a body's specific force, angular rate, and sometimes the magnetic field surrounding the body, using a combination of accelerometers and gyroscopes, sometimes also magnetometers. In this example, the inertial measurement unit 972 determines a head orientation of a wearer of the eyewear device 100 which correlates to a camera orientation of the depth-capturing camera of the eyewear device 100 when the associated depth image is captured. The inertial measurement unit 972 works by detecting linear acceleration using one or more accelerometers and rotational rate using one or more gyroscopes. Typical configurations of inertial measurement units contain one accelerometer, gyro, and magnetometer per axis for each of the three axes: horizontal axis for left-right movement (X), vertical axis (Y) for top-bottom movement, and depth or distance axis for up-down movement (Z). The gyroscope detects the gravity vector. The magnetometer defines the rotation in the magnetic field (e.g., facing south, north, etc.) like a compass which generates a heading reference. The three accelerometers detect acceleration along the horizontal (X), vertical (Y), and depth (Z) axes defined above, which can be defined relative to the ground, the eyewear device 100, the depth-capturing camera, or the user wearing the eyewear device 100.

Memory 934 includes head orientation measurements which correspond to principal axes measurements on the horizontal axis (X axis), vertical axis (Y axis), and depth or distance axis (Z axis) as tracked (e.g., measured) by the inertial measurement unit 972. The head orientation measurements are utilized to determine alignment of the depth-capturing camera, which can be used to identify a floor plane of the initial depth images 961A-N. In certain applications of IMUs, the principal axes are referred to as pitch, roll, and yaw axes.

Memory 934 further includes multiple initial depth images 961A-N, which are generated, via the depth-capturing camera. Memory 934 further includes an initial video 960 which includes a sequence of the initial depth images 961A-N and associated time coordinates. A flowchart outlining functions which can be implemented in the camera misalignment compensation programming 945 is shown in FIG. 11.

As shown in FIG. 9, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the left and right image displays of the optical assembly 180A and 180B. High-speed processor 932 may be any processor capable of managing high-speed communications and operation of any general computing system needed for eyewear device 100. High-speed processor 932 includes processing resources needed for managing high-speed data transfers on high-speed wireless connection 937 to a wireless local area network (WLAN) using high-speed wireless circuitry 936. In some examples, the high-speed processor 932 executes an operating system such as a LINUX operating system or other such operating system of the eyewear device 100 and the operating system is stored in memory 934 for execution. In addition to any other responsibilities, the high-speed processor 932 executing a software architecture for the eyewear device 100 manages data transfers with high-speed wireless circuitry 936. In some examples, high-speed wireless circuitry 936 is configured to implement Institute of Electrical and Electronic Engineers (IEEE) 802.11 communication standards, also referred to herein as Wi-Fi. In other examples, other high-speed communications standards may be implemented by high-speed wireless circuitry 936.

Low-power wireless circuitry 924 and the high-speed wireless circuitry 936 of the eyewear device 100 can include short range transceivers (Bluetooth™) and wireless wide, local, or wide area network transceivers (e.g., cellular or Wi-Fi). Mobile device 990, including the transceivers communicating via the low-power wireless connection 925 and high-speed wireless connection 937, may be implemented using details of the architecture of the eyewear device 100, as can other elements of network 995.

Memory 934 includes any storage device capable of storing various data and applications, including, among other things, camera data generated by the left and right visible light cameras 114A and 114B, infrared camera 220, and the image processor 912, as well as images and videos generated for display by the image display driver 942 on the image displays of the optical assembly 180A and 180B. While memory 934 is shown as integrated with high-speed circuitry 930, in other examples, memory 934 may be an independent standalone element of the eyewear device 100. In some such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

Figure 10:
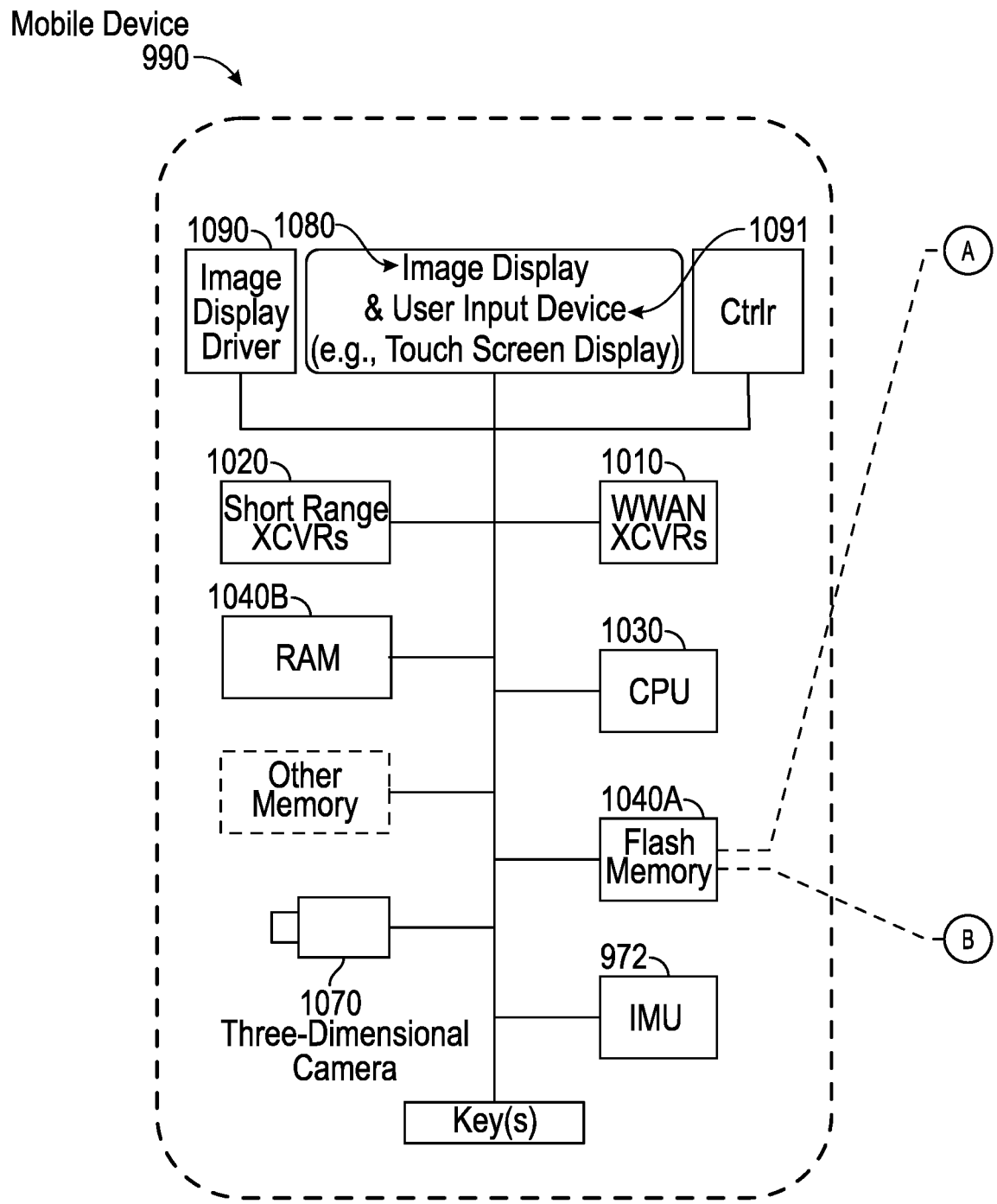
FIG. 10 shows an example of a hardware configuration for the mobile device of the camera misalignment compensation system of FIG. 9.
Figure 10:
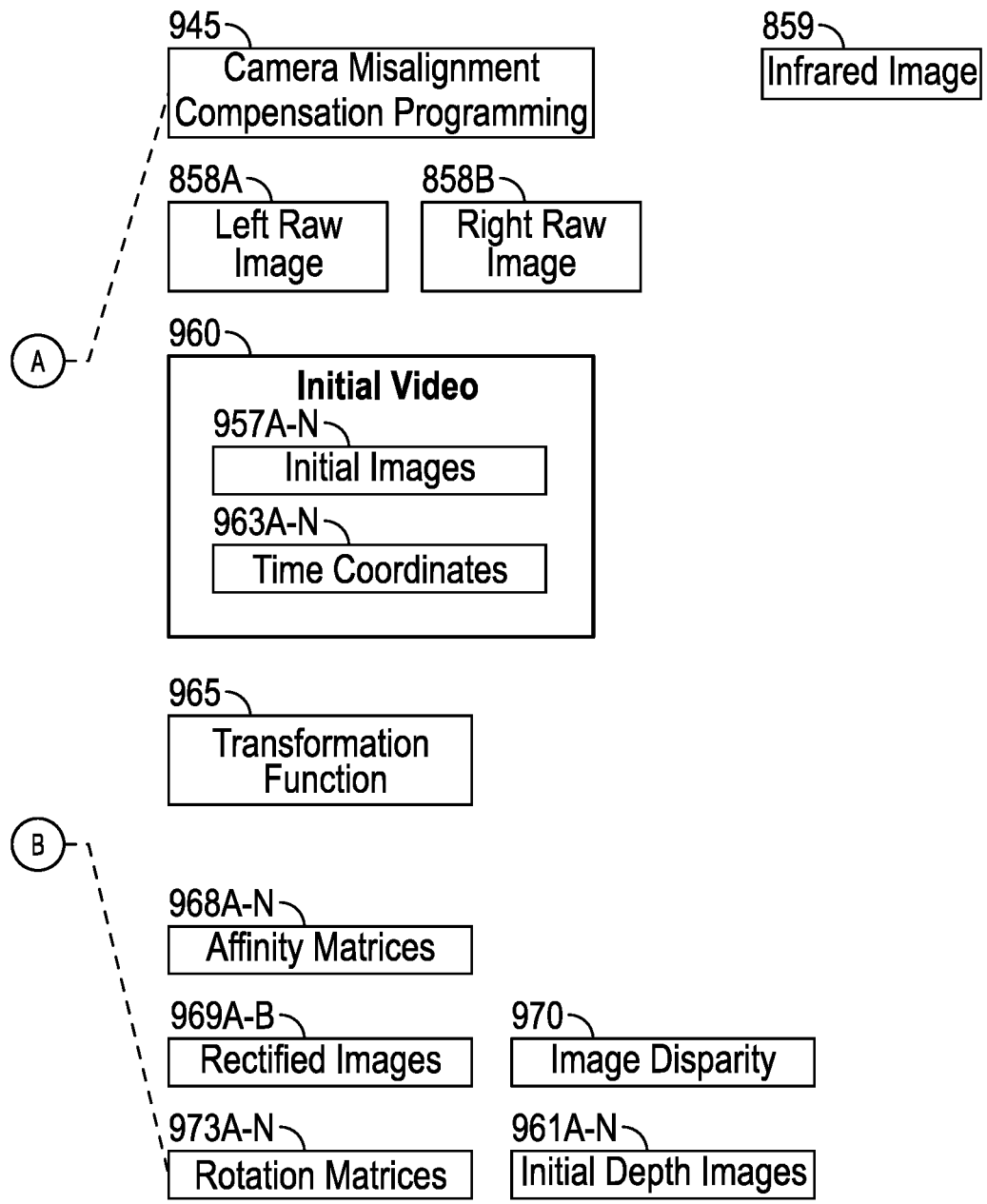

As shown in FIG. 9, the processor 932 of the eyewear device 100 can be coupled to the depth-capturing camera (visible light cameras 114A and 114B; or visible light camera 114A, infrared emitter 215, and infrared camera 220), the image display driver 942, the user input device 991, and the memory 934. As shown in FIG. 10, the processor 1030 of the mobile device 990 can be coupled to the depth-capturing camera 1070, the image display driver 1090, the user input device 1091, and the memory 1040A. Eyewear device 100 can perform all or a subset of any of the following functions described below as a result of the execution of the camera misalignment compensation programming 945 in the memory 934 by the processor 932 of the eyewear device 100. Mobile device 990 can perform all or a subset of any of the following functions described below as a result of the execution of the camera misalignment compensation programming 945 in the memory 1040A by the processor 1030 of the mobile device 990. Functions can be divided in the camera misalignment compensation system 900, such that the eyewear device 100 generates the initial depth images 961A-N from the initial video 960, but the mobile device 990 performs the remainder of the image processing on the initial depth images 961A-N from the initial video 960 to compensation for misalignment of the cameras.

In one example of the camera misalignment compensation system 900, the processor comprises a first processor 932 and a second processor 1030. The memory comprises a first memory 934 and a second memory 1040A. The eyewear device 100 includes a first network communication 924 or 936 interface for communication over a network 925 or 937 (e.g., a wireless short-range network or a wireless local area network), the first processor 932 coupled to the first network communication interface 924 or 936, and the first memory 934 accessible to the first processor 932. Eyewear device 100 further includes camera misalignment compensation programming 945 in the first memory 934. Execution of the camera misalignment compensation programming 945 by the first processor 932 configures the eyewear device 100 to perform the function to capture, via the depth-capturing camera, images.

The camera misalignment compensation system 900 further comprises a host computer, such as the mobile device 990, coupled to the eyewear device 100 over the network 925 or 937. The host computer includes a second network communication interface 1010 or 1020 for communication over the network 925 or 937, the second processor 1030 coupled to the second network communication interface 1010 or 1020, and the second memory 1040A accessible to the second processor 1030. Host computer further includes camera misalignment compensation programming 945 in the second memory 1040A.

Execution of the camera misalignment compensation programming 945 by the second processor 1030 configures the host computer to perform the functions to receive, via the second network communication interface 1010 or 1020, the captured images over the network from the eyewear device 100. Execution of the camera misalignment compensation programming 945 by the second processor 1030 configures the host computer to compensate for misalignment of the cameras and present, via the image display 1080, the compensated images.

In one example, the depth-capturing camera of the eyewear device 100 includes the at least two visible light cameras comprised of a left visible light camera 114A with a left field of view 111A and a right visible light camera 114B with a right field of view 111B. The left field of view 111A and the right field of view 111B have an overlapping field of view 813 (see FIG. 8B). The depth-capturing camera 1070 of the mobile device 990 can be similarly structured.

Generating, via the depth-capturing camera, the initial video 960 including the sequence of initial depth images 961A-N and associated time coordinates can include all or a subset of the following functions. First, capturing, via the left visible light camera 114A, a left raw image 858A that includes a left matrix of pixels. Second, capturing, via the right visible light camera 114B, a right raw image 858B that includes a right matrix of pixels. Third, creating a left rectified image 969A from the left raw image 858A and a right rectified image 969B from the right raw image 858B that align the left and right raw images 858A-B and remove distortion from a respective lens (e.g., at the edges of the lens from vignetting) of each of the left and right visible light cameras 114A and 114B. Fourth, extracting an image disparity 970 by correlating pixels in the left rectified image 969A with the right rectified image 969B to calculate a disparity for each of the correlated pixels. Fifth, calculating the Z location coordinate of vertices of the initial depth image 961A based on at least the extracted image disparity 970 for each of the correlated pixels. Sixth, ordering each of the generated initial depth images 961A-N in the sequence from the initial video 960 based on a timestamp that is captured when the left raw image 858A and the right raw image 858B are captured and setting an associated respective time coordinate of the respective initial depth image 961A-N to the timestamp.

In an example, the depth-capturing camera of the eyewear device 100 includes the at least one visible light camera 114A and the depth sensor 213 (e.g., infrared emitter 215 and infrared camera 220). The at least one visible light camera 114A and the depth sensor 213 have a substantially overlapping field of view 812 (see FIG. 8A). The depth sensor 213 includes an infrared emitter 215 and an infrared camera 220. The infrared emitter 215 is connected to the frame 105 or the temple 125A and 125B to emit a pattern of infrared light. The infrared camera 220 is connected to the frame 105 or the temple 125A and 125B to capture reflection variations in the emitted pattern of infrared light. The depth-capturing camera 1070 of the mobile device 990 can be similarly structured.

Generating, via the depth-capturing camera, the initial depth image 961A can include all or a subset of the following functions. First, capturing, via the at least one visible light camera 114A, a raw image 858A. Second, emitting, via the infrared emitter 215, a pattern of infrared light 781 on a plurality of objects or object features located in a scene 715 that are reached by the emitted infrared light 781. Third, capturing, via the infrared camera 220, an infrared image 859 of reflection variations of the emitted pattern of infrared light 782 on the plurality of objects or object features. Fourth, computing a respective depth from the depth-capturing camera to the plurality of objects or object features, based on the infrared image 859 of reflection variations. Fifth, correlating objects or object features in the infrared image 859 of reflection variations with the raw image 858A. Sixth, calculating the Z location coordinate of vertices of the initial depth image 961A based on, at least, the computed respective depth.

In one example, the user input device 991, 1091 includes a touch sensor including an input surface and a sensor array that is coupled to the input surface to receive at least one finger contact inputted from a user. User input device 991, 1091 further includes a sensing circuit integrated into or connected to the touch sensor and connected to the processor 932, 1030. The sensing circuit is configured to measure voltage to track the at least one finger contact on the input surface. The function of receiving, via the user input device 991, 1091, input parameter identification from the user includes receiving, on the input surface of the touch sensor, the at least one finger contact inputted from the user.

A touch-based user input device 991 can be integrated into the eyewear device 100. As noted above, eyewear device 100 includes an electronic housing 110A and 110B integrated into or connected to the frame 105 on the lateral side 170A and 170B of the eyewear device 100. The frame 105, the temple 125A and 125B, or the electronic housing 110A and 110B includes a circuit board that includes the touch sensor. The circuit board includes a flexible printed circuit board. The touch sensor is disposed on the flexible printed circuit board. The sensor array is a capacitive array or a resistive array. The capacitive array or the resistive array includes a grid that forms a two-dimensional rectangular coordinate system to track X and Y axes location coordinates.

Server system 998 may be one or more computing devices as part of a service or network computing system, for example, that include a processor, a memory, and network communication interface to communicate over the network 995 with the mobile device 990 and eyewear device 100. Eyewear device 100 is connected with a host computer. For example, the eyewear device 100 is paired with the mobile device 990 via the high-speed wireless connection 937 or connected to the server system 998 via the network 995.

Output components of the eyewear device 100 include visual components, such as the left and right image displays of optical assembly 180A and 180B as described in FIGS. 2B and 2C (e.g., a display such as a liquid crystal display (LCD), a plasma display panel (PDP), a light emitting diode (LED) display, a projector, or a waveguide). Left and right image displays of optical assembly 180A and 180B can present the initial video 960 including the sequence of initial depth images 961A-N. The image displays of the optical assembly 180A and 180B are driven by the image display driver 942. Image display driver 942 is coupled to the image display to control the image display to present the initial video 960. The output components of the eyewear device 100 further include acoustic components (e.g., speakers), haptic components (e.g., a vibratory motor), other signal generators, and so forth. The input components of the eyewear device 100, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), biometric components (e.g., a heart rate monitor) and the like.

Eyewear device 100 may optionally include additional peripheral device elements. Such peripheral device elements may include biometric sensors, additional sensors, or display elements integrated with eyewear device 100. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

FIG. 10 is a high-level functional block diagram of an example of a mobile device 990. Mobile device 990 includes a user input device 1091 and an input parameter processor 1092 to receive user selections. Mobile device 990 includes a flash memory 1040A which includes camera misalignment compensation programming 945 to perform all or a subset of the functions described herein for camera misalignment compensation. As shown, memory 1040A further includes a left raw image 858A captured by left visible light camera 114A, a right raw image 858B captured by right visible light camera 114B, and an infrared image 859 captured by infrared camera 220 of the depth sensor 213. Mobile device 1090 can include a depth-capturing camera 1070 that comprises at least two visible light cameras (first and second visible light cameras with overlapping fields of view) or at least on visible light camera and a depth sensor with substantially overlapping fields of view like the eyewear device 100. When the mobile device 990 includes components like the eyewear device 100, such as the depth-capturing camera, the left raw image 858A, the right raw image 858B, and the infrared image 859 can be captured via the depth-capturing camera 1070 of the mobile device 990. A transformation function 965 within the mobile device rectifies the initial images, e.g., to facilitate matching of features and to format the images for viewing.

Figure 11A:
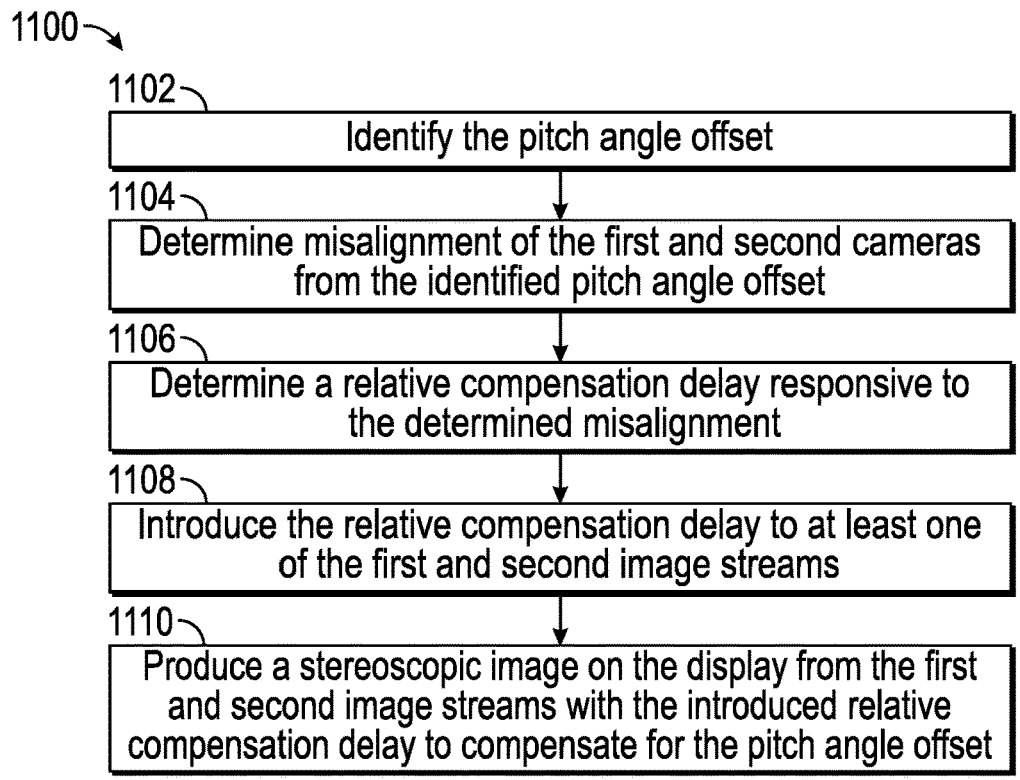
FIGS. 11A, 11B, and 11C are flowcharts of methods the camera misalignment compensation system implements to compensate for misalignment of cameras in a stereoscopic camera system.
Figure 11B:
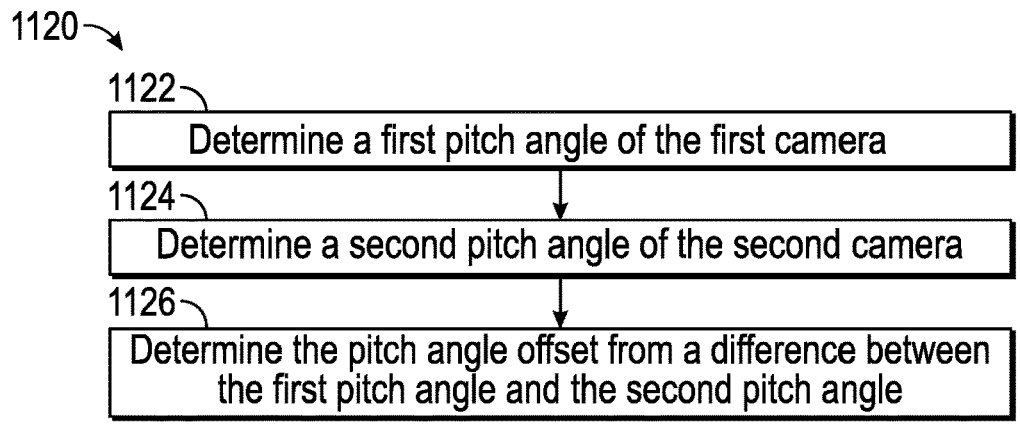
Figure 11C:
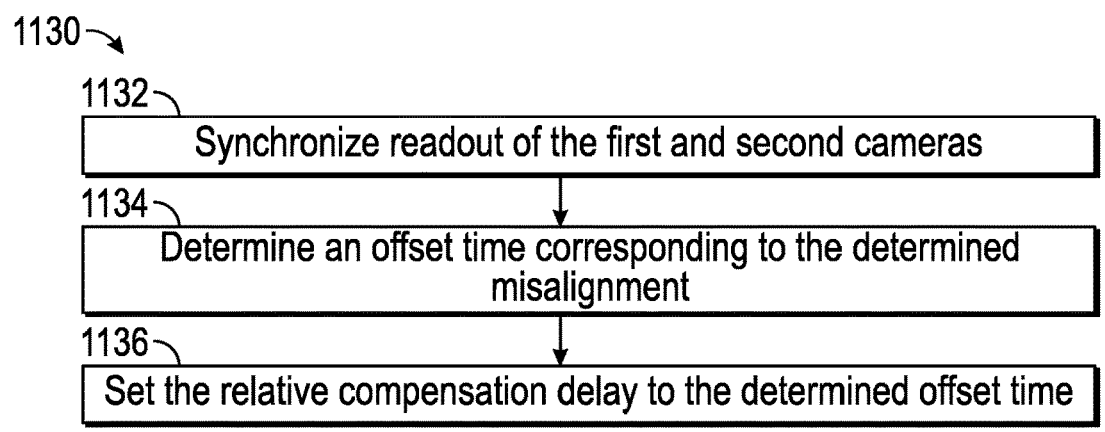

Memory 1040A further includes multiple initial depth images 961A-N, which are generated, via the depth-capturing camera of the eyewear device 100 or via the depth-capturing camera 1070 of the mobile device 990 itself. Memory 1040A further includes an initial video 960 which includes a sequence of the initial depth images 961A-N and associated time coordinates. Flowcharts outlining functions which can be implemented in the camera misalignment compensation programming 945 are shown in FIGS. 11A-11C.

As shown, the mobile device 990 includes an image display 1080, an image display driver 1090 to control the image display, and a user input device 1091 like the eyewear device 100. In the example of FIG. 10, the image display 1080 and user input device 1091 are integrated together into a touch screen display.

Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 10 therefore provides block diagram illustrations of the example mobile device 990 having a touch screen display for displaying content and receiving user input as (or as part of) the user interface.

As shown in FIG. 10, the mobile device 990 includes at least one digital transceiver (XCVR) 1010, shown as WWAN XCVRs, for digital wireless communications via a wide area wireless mobile communication network. The mobile device 990 also includes additional digital or analog transceivers, such as short range XCVRs 1020 for short-range network communication, such as via NFC, VLC, DECT, ZigBee, Bluetooth™, or Wi-Fi. For example, short range XCVRs 1020 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 990, the mobile device 990 can include a global positioning system (GPS) receiver. Alternatively, or additionally the mobile device 990 can utilize either or both the short range XCVRs 1020 and WWAN XCVRs 1010 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 1010, 1020.

The transceivers 1010, 1020 (network communication interface) conform to one or more of the various digital wireless communication standards utilized by modern mobile networks. Examples of WWAN transceivers 1010 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 1010, 1020 provide two-way wireless communication of information including digitized audio signals, still image and video signals, web page information for display as well as web related inputs, and various types of mobile message communications to/from the mobile device 990.

Several of these types of communications through the transceivers 1010, 1020 and a network, as discussed previously, relate to protocols and procedures in support of communications with the eyewear device 100 or the server system 998, such as transmitting left raw image 858A, right raw image 858B, infrared image 859, initial video 960, initial depth images 961A-N, and time coordinates. Such communications, for example, may transport packet data via the short range XCVRs 1020 over the wireless connections 925 and 937 to and from the eyewear device 100 as shown in FIG. 9. Such communications, for example, may also transport data utilizing IP packet data transport via the WWAN XCVRs 1010 over the network (e.g., Internet) 995 shown in FIG. 9. Both WWAN XCVRs 1010 and short range XCVRs 1020 connect through radio frequency (RF) send-and-receive amplifiers (not shown) to an associated antenna (not shown).

The mobile device 990 further includes a microprocessor, shown as CPU 1030, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 1030, for example, may be based on any known or available microprocessor architecture, such as a Reduced Instruction Set Computing (RISC) using an ARM architecture, as commonly used today in mobile devices and other portable electronic devices. Other processor circuitry may be used to form the CPU 1030 or processor hardware in smartphone, laptop computer, and tablet.

The microprocessor 1030 serves as a programmable host controller for the mobile device 990 by configuring the mobile device 990 to perform various operations, for example, in accordance with instructions or programming executable by processor 1030. For example, such operations may include various general operations of the mobile device, as well as operations related to the camera misalignment compensation programming 945 and communications with the eyewear device 100 and server system 998. Although a processor may be configured by use of hardwired logic, typical processors in mobile devices are general processing circuits configured by execution of programming.

The mobile device 990 includes a memory or storage device system, for storing data and programming. In the example, the memory system may include a flash memory 1040A and a random access memory (RAM) 1040B. The RAM 1040B serves as short term storage for instructions and data being handled by the processor 1030, e.g. as a working data processing memory. The flash memory 1040A typically provides longer term storage.

Hence, in the example of mobile device 990, the flash memory 1040A is used to store programming or instructions for execution by the processor 1030. Depending on the type of device, the mobile device 990 stores and runs a mobile operating system through which specific applications, including camera misalignment compensation programming 945, are executed. Applications, such as the camera misalignment compensation programming 945, may be a native application, a hybrid application, or a web application (e.g., a dynamic web page executed by a web browser) that runs on mobile device 990. Examples of mobile operating systems include Google Android, Apple iOS (I-Phone or iPad devices), Windows Mobile, Amazon Fire OS, RIM Blackberry operating system, or the like.

It will be understood that the mobile device 990 is just one type of host computer in the camera misalignment compensation system 900 and that other arrangements may be utilized. For example, a server system 998, such as that shown in FIG. 9, may compensated for misalignment in the depicted images after generation of the initial images 961A-N.

FIGS. 11A, 11B, and 11C are flowcharts 1100, 1120, and 1130 illustrating the operation of the eyewear device 100 and/or other components of the camera misalignment compensation system (e.g., one or more of the processors 912, 932 executing instructions stored in memory 934). The steps are described with reference to hardware described herein but are not to be limited to such implementations. Although shown as occurring serially, the blocks of FIGS. 11A, 11B, and 11C may be reordered or parallelized depending on the implementation. Furthermore, one of skill in the art will understand from the description herein that one or more steps/blocks may be omitted, and one or more additional/alternative steps may be incorporated.

At block 1102, identify a pitch angle offset between sensors/cameras of a stereoscopic camera system. The stereoscopic camera system may include a first camera 114A and a second camera 114B. In one example, identifying the pitch angle offset includes first determining a first pitch angle of a first camera (block 1122; FIG. 11B). Then, determining a second pitch angle of a second camera (block 1124; FIG. 11B). And, then, determining the pitch angle offset from a difference between the first pitch angle and the second pitch angle (block 1126; FIG. 11B). The pitch angle offset may be stored in memory (e.g., memory 934) and retrieve through a call (e.g., from processor 932) to determine the pitch angle offset.

In another example, identification of pitch angle offset is based on flexure of the frame. One or more flex sensors (e.g., a Wheatstone bridge on a flexible PCB within the frame of the eyewear device 100) determine flexure of the frame. The amount of flexure corresponds to a flexure offset. The flexure offset may be the identified pitch angle offset for may be used to adjust pitch angle offset determined in another manner.

At block 1104, determine misalignment of the first and second cameras from the identified pitch angle offset. The misalignment may be a number of lines or pixels between where an image feature (e.g., image feature 802b in FIG. 8F) would be expected to appear in an image and where it appears in the image (e.g., image feature 802b in FIG. 8G). The misalignment may be calculated based on a known relationship between pitch angle offset and number of pixels. In an example, a pitch angle offset of 3.56 degrees may correspond to a range of 40-75 pixels.

At block 1106, determine a relative compensation delay responsive to the determined misalignment. In one example, determining the relative compensation delay includes synchronizing readouts of the first and second cameras (block 1132; FIG. 11C). Then, determining an offset time corresponding to the determined misalignment (block 1134; FIG. 11C). And, then, setting the relative compensation delay to the determined offset time (block 1136; FIG. 11C). In another example, determining the relative compensation delay includes determining the relative compensation delay directly from the determined misalignment without first determining an offset time.

At block 1108, introduce the relative compensation delay. In one example, relative compensation delay is introduced after exposure/capture, e.g., by changing the vertical blanking interval of a camera in order to minimize compensation delay between feature points of first and second image streams from first and second cameras. In another example, the relative compensation delay is introduced prior to exposure/capture, e.g., by configuring the exposure delay such that feature points are exposed at substantially the same time.

At block 1110, produce a stereoscopic image on the display from first and second image streams with the introduced relative compensation delay to compensate for the pitch angle offset. In one example, image processor 912 adjusts the image streams for presentation on the image displays 180A and 180B by the image display driver 942.

The camera misalignment compensation functionality described herein for the eyewear device 100, mobile device 990, and server system 998 can be embodied in one or more applications as described previously. According to some examples, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A camera compensation system comprising:
    an eyewear device including:
        a frame; and
        a stereoscopic camera including a first camera adjacent a first side of the frame to capture a first image and a second camera adjacent a second side of the frame to capture a second image, the first camera having a first plurality of imaging lines with a rolling shutter that produces a first image stream, the second camera having a second plurality of imaging lines with a rolling shutter that produces a second image stream, and the first and second cameras having an overlapping field of view and a pitch angle offset, at least one of the first and second cameras having an adjustable exposure time;
    an image display for presenting a stereoscopic image produced from the first and second image streams;
    an image display driver coupled to the image display to control the image display to present the stereoscopic image responsive to the pitch angle offset;
    a memory;
    a processor coupled to the stereoscopic camera, the image display driver, and the memory; and
    programming in the memory, wherein execution of the programming by the processor configures the camera compensation system to perform functions, including functions to:
        identify the pitch angle offset;
        determine misalignment of the first and second cameras from the identified pitch angle offset;
        determine a relative compensation delay responsive to the determined misalignment;
        introduce the relative compensation delay to at least one of the first and second image streams by adjusting the adjustable exposure time of the at least one of the first and second cameras prior to capturing the first and second images; and
        produce a stereoscopic image on the display from the first and second image streams with the introduced relative compensation delay to compensate for the pitch angle offset.

2. The system of claim 1, wherein execution of the programming by the processor identifies the pitch angle offset by performing functions to:
    determine a first pitch angle of the first camera;
    determine a second pitch angle of the second camera; and
    determine the pitch angle offset from a difference between the first pitch angle and the second pitch angle.

3. The system of claim 1, wherein execution of the programming by the processor identifies the pitch angle offset by performing functions to:
    determine flexure of the frame; and
    determine the pitch angle offset from the flexure of the frame.

4. The system of claim 1, wherein the pitch angle offset is stored in the memory and wherein execution of the programming by the processor identifies the pitch angle offset by performing functions to:
    retrieve the pitch angle offset from the memory; and
    determine the pitch angle offset from the retrieved pitch angle offset.

5. The system of claim 1, wherein execution of the programming by the processor determines the misalignment of the first and second cameras by performing functions to:
    determine a number of offset lines between the first plurality of imaging lines and the second plurality of imaging lines corresponding to the pitch angle offset.

6. The system of claim 5, wherein execution of the programming by the processor determines the relative compensation delay by performing functions to:
    determine an offset time corresponding to the number of offset lines; and
    adjust the relative compensation delay by the determined offset time.

7. The system of claim 1, wherein execution of the programming by the processor determines the relative compensation delay by performing functions to:
  determine an offset time corresponding to the determined misalignment; and
  adjust the relative compensation delay by the determined offset time.

8. A camera compensation method comprising:
  identifying a pitch angle offset between a first camera and a second camera of a stereoscopic camera system supported by a frame of an eyewear device, the first camera having a first plurality of imaging lines with a rolling shutter that produces a first image stream, the second camera having a second plurality of imaging lines with a rolling shutter that produces a second image stream, the first and second cameras having an overlapping field of view, and at least one of the first and second cameras having an adjustable exposure time;
  determining misalignment of the first and second cameras from the identified pitch angle offset;
  determining a relative compensation delay responsive to the determined misalignment;
  introducing the relative compensation delay to at least one of the first and second image streams by adjusting the adjustable exposure time of the at least one of the first and second cameras prior to capturing the first and second images; and
  producing a stereoscopic image on a display from the first and second image streams with the introduced relative compensation delay to compensate for the pitch angle offset.

9. The method of claim 8, wherein identifying the pitch angle offset comprises:
  determining a first pitch angle of the first camera;
  determining a second pitch angle of the second camera; and
  determining the pitch angle offset from a difference between the first pitch angle and the second pitch angle.

10. The method of claim 8, wherein identifying the pitch angle offset comprises:
  determining flexure of the frame; and
  determining the pitch angle offset from the flexure of the frame.

11. The method of claim 8, wherein the pitch angle offset is stored in a memory and wherein identifying the pitch angle offset comprises:
  retrieving the pitch angle offset from the memory; and
  determining the pitch angle offset from the retrieved pitch angle offset.

12. The method of claim 8, wherein determining the misalignment of the first and second cameras comprises:
  determining a number of offset lines between the first plurality of imaging lines and the second plurality of imaging lines corresponding to the pitch angle offset.

13. The method of claim 12, wherein determining the relative compensation delay comprises:
  determining an offset time corresponding to the number of offset lines; and
  adjusting the relative compensation delay by the determined offset time.

14. The method of claim 8, wherein determining the relative compensation delay comprises:
  determining an offset time corresponding to the determined misalignment; and
  adjusting the relative compensation delay by the determined offset time.

15. A non-transitory computer readable medium comprising instructions which, when executed by a processor, cause an electronic system to:
  identify a pitch angle offset between a first camera and a second camera of a stereoscopic camera system supported by a frame of an eyewear device, the first camera having a first plurality of imaging lines with a rolling shutter that produces a first image stream, the second camera having a second plurality of imaging lines with a rolling shutter that produces a second image stream, the first and second cameras having an overlapping field of view, and at least one of the first and second cameras having an adjustable exposure time;
  determine misalignment of the first and second cameras from the identified pitch angle offset;
  determine a relative compensation delay responsive to the determined misalignment;
  introduce the relative compensation delay to at least one of the first and second image streams by adjusting the adjustable exposure time of the at least one of the first and second cameras prior to capturing the first and second images; and
  produce a stereoscopic image on a display from the first and second image streams with the introduced relative compensation delay to compensate for the pitch angle offset.

16. The non-transitory computer readable medium of claim 15, wherein determining the relative compensation delay comprises:
  determining an offset time corresponding to the number of offset lines or corresponding to the determined misalignment; and
  adjusting the relative compensation delay by the determined offset time.

* * * * *